(12) United States Patent
Arakawa et al.

(10) Patent No.: US 6,400,433 B1
(45) Date of Patent: Jun. 4, 2002

(54) CIRCULARLY POLARIZING PLATE COMPRISING LINEARLY POLARIZING MEMBRANE AND QUARTER WAVE PLATE

(75) Inventors: Kohei Arakawa, Odawara; Ken Kawata, Minami-ashigara; Mitsuyoshi Ichihashi, Fujinomiya, all of (JP)

(73) Assignee: Fuji Photo Film Co., Ltd., Minami-ashigara (JP)

( * ) Notice: Subject to any disclaimer, the term of this patent is extended or adjusted under 35 U.S.C. 154(b) by 0 days.

(21) Appl. No.: 09/435,620

(22) Filed: Nov. 8, 1999

(30) Foreign Application Priority Data

| Nov. 6, 1998 | (JP) | 10-332007 |
| Jan. 14, 1999 | (JP) | 11-007272 |
| Jan. 27, 1999 | (JP) | 11-018900 |
| Mar. 31, 1999 | (JP) | 11-091164 |
| Jul. 30, 1999 | (JP) | 11-217547 |

(51) Int. Cl.$^7$ .................................. G02F 1/1335
(52) U.S. Cl. .......................... 349/117; 349/75
(58) Field of Search .................. 349/117–121, 194, 349/75

(56) References Cited

U.S. PATENT DOCUMENTS

| 5,518,783 A | * | 5/1996 | Kawata et al. | 428/1 |
| 5,583,679 A | * | 12/1996 | Ito et al. | 349/118 |
| 5,646,703 A | * | 7/1997 | Kamada et al. | 349/118 |
| 5,667,854 A | * | 9/1997 | Yamada | 428/1 |
| 5,736,067 A | * | 4/1998 | Kawata et al. | 252/299.5 |
| 6,064,457 A | * | 5/2000 | Aminaka | 349/117 |
| 6,157,427 A | * | 12/2000 | Saynor et al. | 349/123 |

* cited by examiner

*Primary Examiner*—Toan Ton
*Assistant Examiner*—Andrew Schechter
(74) *Attorney, Agent, or Firm*—Burns, Doane, Swecker & Mathis, LLP

(57) ABSTRACT

A circularly polarizing plate comprises a linearly polarizing membrane and a quarter wave plate. The quarter wave plate comprises an optically anisotropic layer A and an optically anisotropic layer B. The quarter wave plate has such an optical characteristic that a retardation value essentially is a quarter of a wavelength when the retardation value is measured at the wavelength of 450 nm, 550 nm and 650 nm. One of the optically anisotropic layers A and B is a layer made from liquid crystal molecules, and the other is a polymer film or a layer made from liquid crystal molecules.

14 Claims, 22 Drawing Sheets

FIG. 6
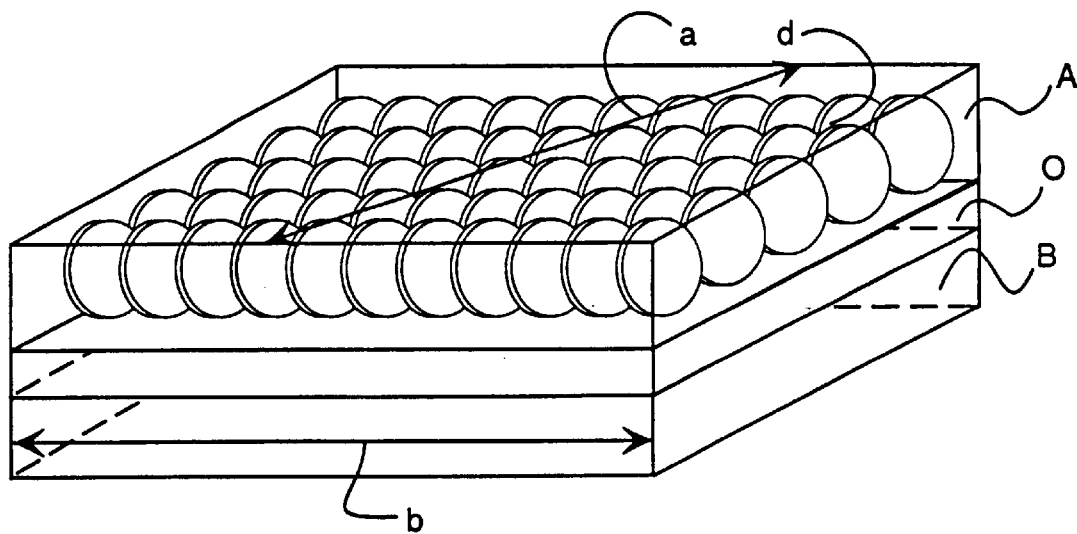
FIG. 7
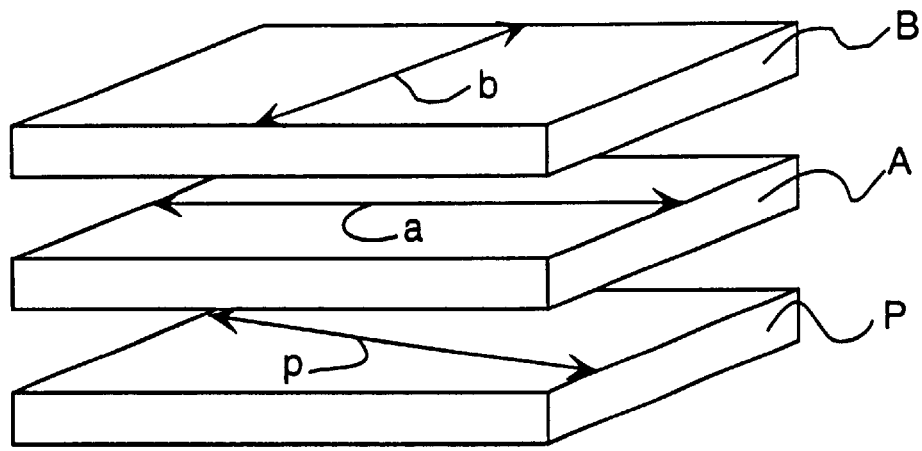
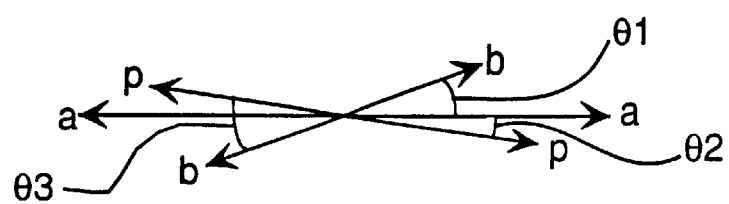

FIG. 8
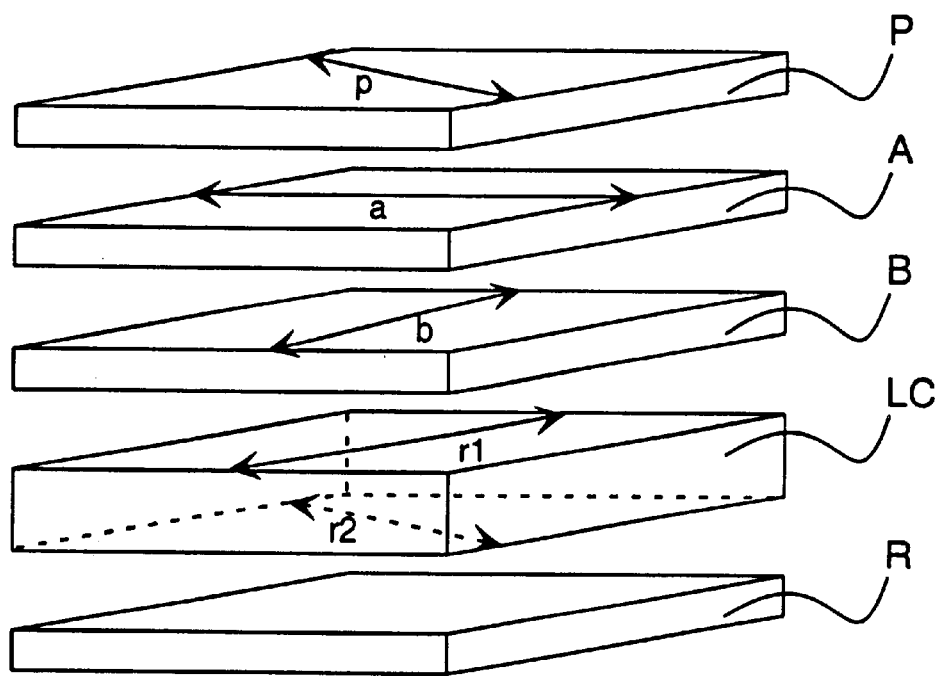
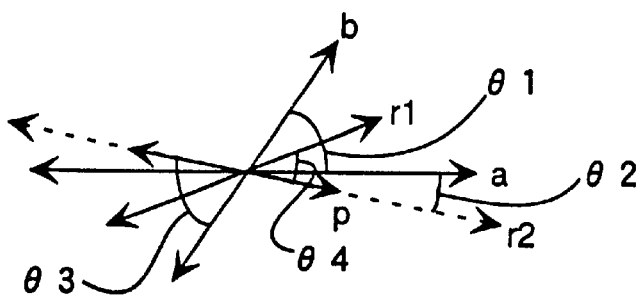

→ Quarter wave plate
→ Optically anisotropic layer A
→ Optically anisotropic layer B ——— Example 14
·········· Example 15

US 6,400,433 B1

CIRCULARLY POLARIZING PLATE COMPRISING LINEARLY POLARIZING MEMBRANE AND QUARTER WAVE PLATE

FIELD OF THE INVENTION

The present invention relates to a circularly polarizing plate comprising a linearly polarizing membrane and a quarter wave plate.

BACKGROUND OF THE INVENTION

A circularly polarizing plate has a function of extracting circularly polarized light from non-polarized light. The circularly polarizing plate usually comprises a linearly polarizing membrane and a quarter wave (λ/4) plate. The linearly polarizing membrane has a function of extracting linearly polarized light from non-polarized light, and the quarter wave plate has a function of converting the extracted linearly polarized light to circularly polarized light.

The circularly polarizing plate has been used in various optical devices such as a reflective liquid crystal display, a pick up device for recording an optical disc, an organic electroluminescence (EL) display or an antireflection film. The optical characteristic of the circularly polarizing plate depends on the function of the quarter wave plate.

Various quarter wave plates have been proposed and used in optical devices. However, most of the conventional plates can function as a quarter wave plate merely at a specific wavelength. If a quarter wave plate functions merely at a specific wavelength, a circularly polarizing plate using the quarter wave plate should function merely at the specific wavelength.

Japanese Patent Provisional Publication No. 5(1993)-27118 discloses a quarter wave plate comprising two polymer films, in which an angle between the slow axes of the films is essentially 90°. The disclosed quarter wave plate can function within a wide wavelength range.

Each of Japanese Patent Provisional Publication Nos. 10(1998)-68816 and 10(1998)-90521 discloses a quarter wave plate comprising two polymer films, in which an angle between the slow axes of the films is essentially 60°. The disclosed quarter wave plate can also function within a wide wavelength range.

SUMMARY OF THE INVENTION

Each of the quarter wave plates disclosed in Japanese Patent Provisional Publication Nos. 5(1993)-27118, 10(1998)-68816 and 10(1998)-90521 can function within a wide wavelength range. However, the quarter wave plate comprises two polymer films. The directions of the slow axes of two polymer films should be adjusted to obtain a quarter wave plate. It is difficult to adjust the directions of two polymer films. A circularly polarizing plate further comprises a linearly polarizing membrane, which is also made of a polymer film (usually a polyvinyl alcohol film). The direction of the transparent axis of the linearly polarizing membrane should also be adjusted to obtain a circularly polarizing plate. It is more difficult to adjust the directions of three polymer films.

In preparation of the circularly polarizing plate comprising three polymer films, the films should be cut into chips (small pieces) along a predetermined direction, and then pasted together while adjusting the directions of the slow axes and the transparent axis. The process of pasting the chips together is troublesome. The optical characteristic of the plate is sometimes degraded where the axes are shifted in the process. The troublesome process decreases the yield of the plate, and increases the cost. Further, the chips are sometimes contaminated at the troublesome process.

Further, the circularly polarizing plate is rather thick because the plate comprises three polymer films.

An object of the present invention is to provide a circularly polarizing plate which functions within a wide wavelength range.

Another object of the invention is to provide a circularly polarizing plate which can easily be prepared without a troublesome process.

A further object of the invention is to provide a thin circularly polarizing plate.

The present invention provides a circularly polarizing plate which comprises a linearly polarizing membrane and a quarter wave plate comprising an optically anisotropic layer A and an optically anisotropic layer B, said quarter wave plate having such an optical characteristic that a retardation value essentially is a quarter of a wavelength when the retardation value is measured at the wavelength of 450 nm, 550 nm and 650 nm, wherein one of the optically anisotropic layers A and B is a layer made from liquid crystal molecules, and the other is a polymer film or a layer made from liquid crystal molecules.

The circularly polarizing plate of the present invention can function within a wide wavelength range (450 nm to 650 nm). The plate of the invention is characterized in that at least one of the optically anisotropic layers A and B is made from liquid crystal molecules.

The applicants have found that liquid crystal molecules are advantageously used in an optically anisotropic layer of the circularly polarizing plate. The direction of the slow axis of a layer made from liquid crystal molecules can easily be adjusted by controlling the alignment of the liquid crystal molecules. Therefore, the circularly polarizing plate of the present invention can easily be prepared without a troublesome process such as a process of cutting films into chips or a process of pasting chips together.

Further, liquid crystal molecules have a high optical anisotropy, compared with a polymer film. Accordingly, an optically anisotropic layer made from the liquid crystal molecules is usually thinner than a layer made of a polymer film. Therefore, a thin circularly polarizing plate can be obtained according to the present invention.

BRIEF DESCRIPTION OF THE DRAWINGS

Each of FIGS. 1 to 3 schematically illustrates a quarter wave plate used in the first embodiment of a circularly polarizing plate.

Each of FIGS. 4 to 6, 10, 12, 15 and 17 schematically illustrates a quarter wave plate used in the second embodiment of a circularly polarizing plate.

Each of FIGS. 7, 11, 13, 16 and 18 schematically illustrates a circularly polarizing plate according to the second embodiment.

FIG. 8 schematically illustrates a reflective liquid crystal display using the second embodiment of a circularly polarizing plate.

Figure 9:
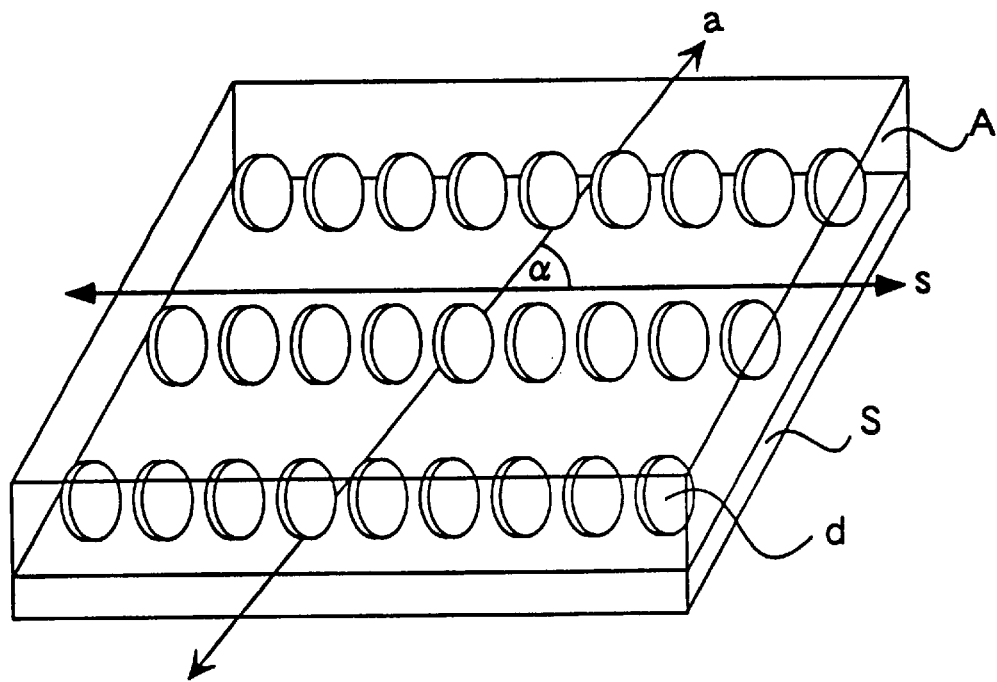
Figure 14:
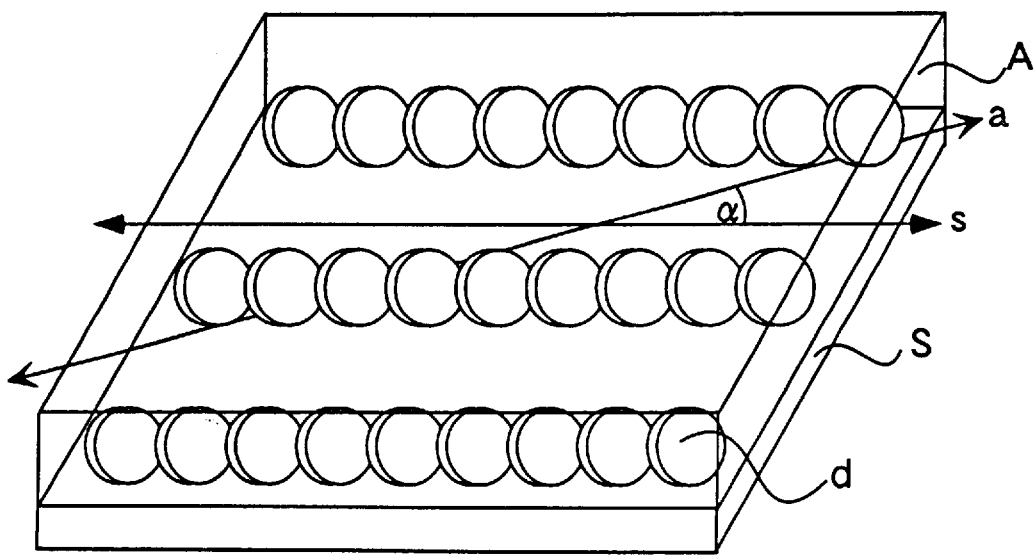

Each of FIGS. 9 and 14 schematically illustrates an optically anisotropic layer A used in the second embodiment of a circularly polarizing plate.

FIGS. 19 to 29 are graphs showing optical characteristics of optically anisotropic layers or quarter wave plates prepared in Examples.

DETAILED DESCRIPTION OF THE INVENTION

[Optical Characteristics]

A quarter wave plate used in a circularly polarizing plate functions within a wide wavelength range. In more detail, the quarter wave plate has such an optical characteristic that a retardation value essentially is a quarter of a wavelength when the retardation value is measured at the wavelength of 450 nm, 550 nm and 650 nm. The expression that a retardation value essentially is a quarter of a wavelength means that the ratio (Re/λ) of the retardation value (Re) to the wavelength (λ) is in the range of 0.20 to 0.30. The ratio of Re/λ is preferably in the range of 0.21 to 0.29, more preferably in the range of 0.22 to 0.28, further preferably in the range of 0.23 to 0.27, and most preferably in the range of 0.24 to 0.26.

The retardation value (Re) is defined by the following formula.

$$Re=(nx-ny) \times d$$

in which each of nx and ny is a main refractive index in plane of a quarter wave plate; and d is a thickness (nm) of quarter wave plate.

The above-described quarter wave plate is obtained by a combination of two optically anisotropic layers A and B.

The combinations of the optically anisotropic layers are classified into the first and second embodiments.

According to the first embodiment, an angle between the slow axis of the optically anisotropic layer A and the slow axis of the optically anisotropic layer B is arranged. in the range of 75° to 105°. The angle is preferably in the range of 80° to 100°, more preferably in the range of 85° to 95°, and most preferably in the range of 87° to 93°.

In the specification, the term "slow axis" means the direction showing the maximum refractive index.

In the first embodiment, the optically anisotropic layers A and B preferably have retardation values defined by the formulas (1) and (2).

$$Re550A < Re550B \tag{1}$$

$$Re450B/Re550B < Re450A/Re550A \tag{2}$$

in which Re450A and Re550A are the retardation values of the optically anisotropic layer A when the values are measured at the wavelengths of 450 nm and 550 nm respectively; and Re450B and Re550B are the retardation values of the optically anisotropic layer B when the values are measured at the wavelengths of 450 nm and 550 nm respectively.

The values of Re550A and Re550B more preferably satisfy the formula (1a), further preferably satisfy the formula (1b), furthermore preferably satisfy the formula (1c), still furthermore preferably satisfy the formula (1d), and most preferably satisfy the formula (1e).

$$100 \text{ nm} < Re550B - Re550A < 180 \text{ nm} \tag{1a}$$

$$120 \text{ nm} < Re550B - Re550A < 160 \text{ nm} \tag{1b}$$

$$130 \text{ nm} < Re550B - Re550A < 150 \text{ nm} \tag{1c}$$

$$130 \text{ nm} < Re550B - Re550A < 145 \text{ nm} \tag{1d}$$

$$135 \text{ nm} < Re550B - Re550A < 140 \text{ nm} \tag{1e}$$

The values of Re450A, Re550A, Re450B and Re550B also preferably satisfy the formula (2a), more preferably satisfy the formula (2b).

$$Re450A/Re550A - Re450B/Re550B > 0.08 \tag{2a}$$

$$Re450A/Re550A - Re450B/Re550B > 0.10 \tag{2b}$$

The values of Re450A and Re550A preferably satisfy the formula (3a), more preferably satisfy the formula (3b), and most preferably satisfy the formula (3c).

$$1.3 < Re450A/Re550A \tag{3a}$$

$$1.45 < Re450A/Re550A \tag{3b}$$

$$1.6 < Re450A/Re550A \tag{3c}$$

The values of Re450B and Re550B preferably satisfy the formula (4a), more preferably satisfy the formula (4b), and most preferably satisfy the formula (4c).

$$Re450B/Re550B < 1.2 \tag{4a}$$

$$Re450B/Re550B < 1.15 \tag{4b}$$

$$Re450B/Re550B < 1.1 \tag{4c}$$

A linearly polarizing membrane has a polarizing axis. In the quarter wave plate of the first embodiment an angle between the polarizing axis and the slow axis of the optically anisotropiclayer A is preferably in the range of 40° to 50°, and an angle between the polarizing axis and the slow axis of the optically anisotropic layer B is also preferably in the range of 40° to 50°. The angle between the polarizing axis and the slow axis of the optically anisotropic layer A or B is more preferably in the range of 41° to 49°, further preferably in the range of 42° to 48°, furthermore preferably in the range of 43° to 47°, and most preferably in the range of 44° to 46°.

In the case that the quarter wave plate of the first embodiment further comprises a transparent support having a lengthwise direction, an angle between the lengthwise direction and the slow axis of the optically anistropic layer A is preferably in the range of 40° to 50°, and an angle between the lengthwise direction and the slow axis of the optically anisotropic layer B is also preferably in the range of 40° to 50°. The angle between the lengthwise direction and the slow axis of the optically anisotropic layer A or B is more preferably in the range of 41° to 49°, further preferably in the range of 42° to 48°, furthermore preferably in the range of 43° to 47°, and most preferably in the range of 44° to 46°. The support having a lengthwise direction is in the form of a roll or a rectanglar sheet. The lengthwise direction of a rolled support means the rolling direction of the support. The lengthwise direction of a rectanglar support means the direction along the long side.

According to the second embodiment, an angle between the slow axis of the optically anisotropic layer A and the slow axis of the optically anisotropic layer B is arranged in the range of 50° to 70°. The angle is preferably in the range of 52° to 68°, more preferably in the range of 54° to 66°, further preferably in the range of 55° to 65°, and most preferably in the range of 56° to 64°.

In the second embodiment, the optically anisotropic layer A preferably has a retardation value in the range of 150 to 350 nm when the value is measured at the wavelength of 550 nm. The retardation value is more preferably in the range of 210 to 300 nm, further preferably in the range of 220 to 296 nm, furthermore preferably in the range of 230 to 292 nm, still furthermore preferably in the range of 240 to 288 nm, and most preferably in the range of 250 to 284 nm.

In the second embodiment, the optically anisotropic layer B preferably has a retardation value in the range of 60 to 170 nm when the value is measured at the wavelength of 550 nm. The retardation value is more preferably in the range of 115 to 150 nm, further preferably in the range of 118 to 148 nm, furthermore preferably in the range of 121 to 146 nm, still furthermore preferably in the range of 122 to 144 nm, and most preferably in the range of 125 to 142 nm.

In the case that the optically anisotropic layer A of the second embodiment is a layer made from liquid crystal molecules, the liquid crystal molecules can be twisted at a twist angle in the range of 3° to 45°.

A linearly polarizing membrane has a polarizing axis. In the quarter wave plate of the second embodiment an angle between the polarizing axis and the slow axis of one of the optically anisotropic layers A and B is preferably in the range of 60° to 80°, and an angle between the polarizing axis and the slow axis of the other is preferably in the range of 10° to 30°. The angle between the polarizing axis and the slow axis of one of the layers A and B is more preferably in the range of 64° to 79°, further preferably in the range 68° to 78°, furthermore preferably in the range of 72° to 77°, and most preferably in the range of 74° to 76°. The angle between the polarizing axis and the slow axis of the other of the layers A and B is more preferably in the range of 11° to 26°, further preferably in the range 12° to 22°, furthermore preferably in the range of 13° to 18°, and most preferably in the range of 14° to 16°.

In the case that the quarter wave plate of the second embodiment further comprises a transparent support having a lengthwise direction, an angle between the lengthwise direction and the slow axis of one of the optically anisotropic layers A and B is preferably in the range of 60° to 80°, and an angle between the lengthwise direction and the slow axis of the other is preferably in the range of 10° to 30°. The angle between the lengthwise direction and the slow axis of one of the layers A and B is more preferably in the range of 64° to 79°, further preferably in the range 68° to 78°, furthermore preferably in the range of 72° to 77°, and most preferably in the range of 74° to 76°. The angle between the lengthwise direction and the slow axis of the other of the layers A and B is more preferably in the range of 11° to 26°, further preferably in the range 12° to 22°, furthermore preferably in the range of 13° to 18°, and most preferably in the range of 14° to 16°. The support having a lengthwise direction is in the form of a roll or a rectanglar sheet. The lengthwise direction of a rolled support means the rolling direction of the support. The lengthwise direction of a rectanglar support means the direction along the long side.

[Layered Structure]

Figure 1:
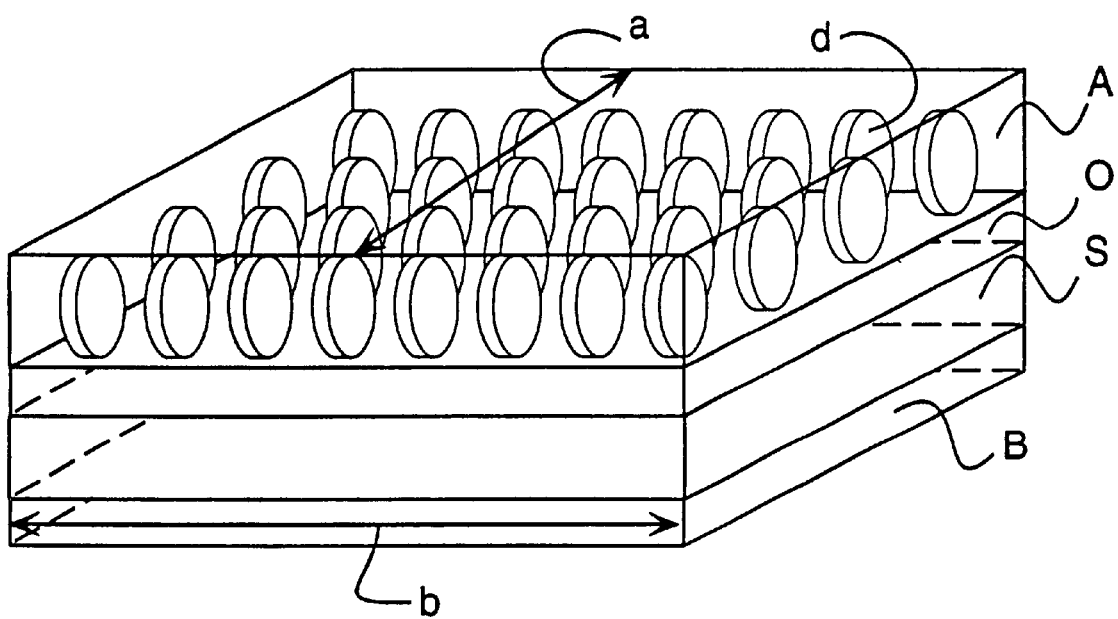

FIG. 1 schematically illustrates a quarter wave plate used in the first embodiment of a circularly polarizing plate.

The quarter wave plate shown in FIG. 1 comprises an optically anisotropic layer B (B), a transparent support (S), an orientation layer (O) and an optically anisotropic layer A (A) in this order.

The optically anisotropic layer A (A) has a slow axis (a) in plane, and the optically anisotropic layer B (B) also has a slow axis (b) in plane. The angle between the slow axes (a) and (b) is 90°.

The optically anisotropic layer A (A) is made from discotic liquid crystal molecules (d). The discotic liquid crystal molecules (d) are essentially vertically aligned in the optically anisotropic layer A (A). The directions of the discotic cores of the discotic liquid crystal molecules (d) correspond to the slow axis (a) of the optically anisotropic layer A (A).

The optically anisotropic layer B (B) is a polymer film, which has been uniaxially stretched. In the case that the polymer used in the film has a positive birefringence, the direction of stretch corresponds to the direction of the slow axis (b). In the case that the polymer used in the film has a negative birefringence, the direction of stretch is perpendicular to the direction of the slow axis (b).

Figure 2:
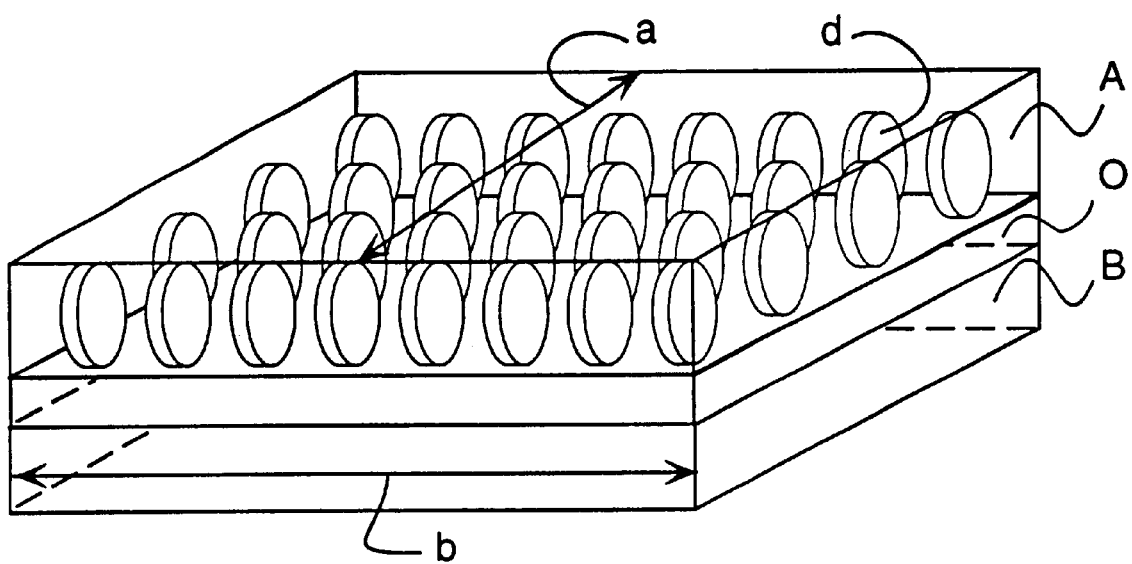

FIG. 2 also schematically illustrates a quarter wave plate used in the first embodiment of a circularly polarizing plate.

The quarter wave plate shown in FIG. 2 comprises an optically anisotropic layer B (B), an orientation layer (O) and an optically anisotropic layer A (A) in this order.

The optically anisotropic layer A (A) has a slow axis (a) in plane, and the optically anisotropic layer B (B) also has a slow axis (b) in plane. The angle between the slow axes (a) and (b) is 90°.

The optically anisotropic layer A (A) is made from discotic liquid crystal molecules (d). The discotic liquid crystal molecules (d) are essentially vertically aligned in the optically anisotropic layer A (A). The directions of the discotic cores of the discotic liquid crystal molecules (d) correspond to the slow axis (a) of the optically anisotropic layer A (A).

The optically anisotropic layer B (B) is a polymer film, which has been uniaxially stretched. In the case that the polymer used in the film has a positive birefringence, the direction of stretch corresponds to the direction of the slow axis (b). In the case that the polymer used in the film has a negative birefringence, the direction of stretch is perpendicular to the direction of the slow axis (b).

Figure 3:
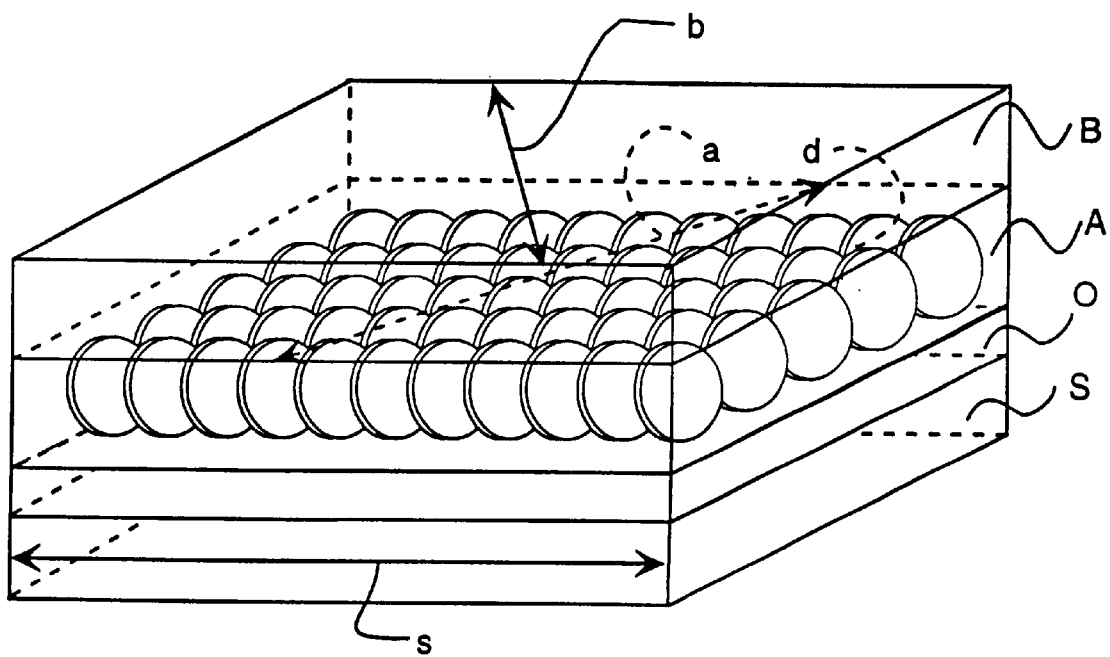

FIG. 3 further schematically illustrates a quarter wave plate used in the first embodiment of a circularly polarizing plate.

The quarter wave plate shown in FIG. 3 comprises a transparent support (S), an orientation layer (O), an optically anisotropic layer A (A) and an optically anisotropic layer B (B) in this order.

The optically anisotropic layer A (A) has a slow axis (a) in plane, and the optically anisotropic layer B (B) also has a slow axis (b) in plane. The angle between the slow axes (a) and (b) is 90°. The transparent support (S) has a lengthwise direction (s). The angle between the lengthwise direction (s) and the a slow axis (a) is 45°, and the angle between the lengthwise direction (s) and the a slow axis (b) is also 45°.

The optically anisotropic layer A (A) is made from discotic liquid crystal molecules (d). The discotic liquid crystal molecules (d) are essentially vertically aligned in the optically anisotropic layer A (A). The directions of the discotic cores of the discotic liquid crystal molecules (d) correspond to the slow axis (a) of the optically anisotropic layer A (A).

The optically anisotropic layer B (B) is a polymer film, which has been uniaxially stretched.

Figure 4:
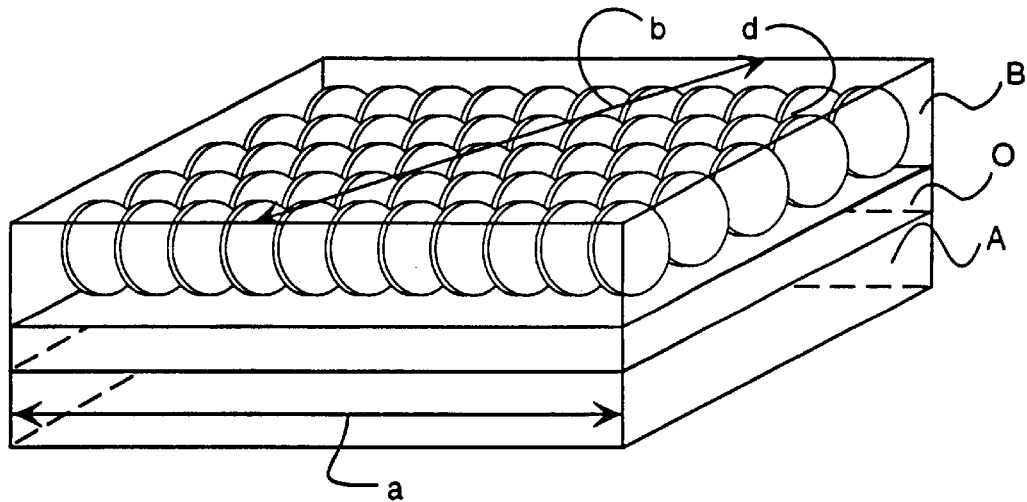

FIG. 4 schematically illustrates a quarter wave plate used in the second embodiment of a circularly polarizing plate.

The quarter wave plate shown in FIG. 4 comprises an optically anisotropic layer A (A), an orientation layer (O) and an optically anisotropic layer B (B) in this order.

The optically anisotropic layer A (A) has a slow axis (a) in plane, and the optically anisotropic layer B (B) also has a slow axis (b) in plane. The angle between the slow axes (a) and (b) is 60°.

The optically anisotropic layer A (A) is a polymer film, which has been uniaxially stretched. In the case that the polymer used in the film has a positive birefringence, the direction of stretch corresponds to the direction of the slow axis (a). In the case that the polymer used in the film has a negative birefringence, the direction of stretch is perpendicular to the direction of the slow axis (a).

The optically anisotropic layer B (B) is made from discotic liquid crystal molecules (d). The discotic liquid crystal molecules (d) are essentially vertically aligned in the optically anisotropic layer B (B). The directions of the discotic cores of the discotic liquid crystal molecules (d) correspond to the slow axis (b) of the optically anisotropic layer B (B).

Figure 5:
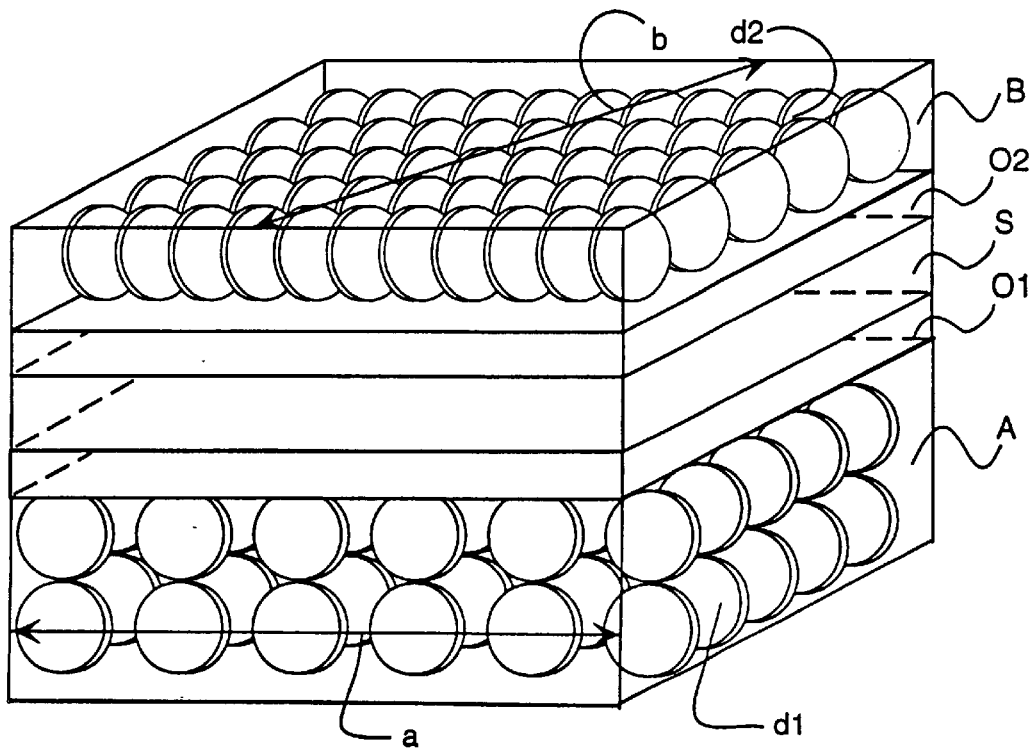

FIG. 5 also schematically illustrates a quarter wave plate used in the second embodiment of a circularly polarizing plate.

The quarter wave plate shown in FIG. 5 comprises an optically anisotropic layer A (A), an orientation layer (O1), a transparent support (S), an orientation layer (O2) and an optically anisotropic layer B (B) in this order.

The optically anisotropic layer A (A) has a slow axis (a) in plane, and the optically anisotropic layer B (B) also has a slow axis (b) in plane. The angle between the slow axes (a) and (b) is 60°.

The optically anisotropic layer A (A) is made from discotic liquid crystal molecules (d1). The discotic liquid crystal molecules (d1) are essentially vertically aligned in the optically anisotropic layer A (A). The directions of the discotic cores of the discotic liquid crystal molecules (d1) correspond to the slow axis (a) of the optically anisotropic layer A (A).

The optically anisotropic layer B (B) is also made from discotic liquid crystal molecules (d2). The discotic liquid crystal molecules (d2) are essentially vertically aligned in the optically anisotropic layer B (B). The directions of the discotic cores of the discotic liquid crystal molecules (d2) correspond to the slow axis (b) of the optically anisotropic layer B (B).

FIG. 6 further schematically illustrates a quarter wave plate used in the second embodiment of a circularly polarizing plate.

The quarter wave plate shown in FIG. 6 comprises an optically anisotropic layer B (B), an orientation layer (O) and an optically anisotropic layer A (A) in this order.

The optically anisotropic layer A (A) has a slow axis (a) in plane, and the optically anisotropic layer B (B) also has a slow axis (b) in plane. The angle between the slow axes (a) and (b) is 60°.

The optically anisotropic layer A (A) is made from discotic liquid crystal molecules (d). The discotic liquid crystal molecules (d) are essentially vertically aligned in the optically anisotropic layer A (A). The directions of the discotic cores of the discotic liquid crystal molecules (d) correspond to the slow axis (a) of the optically anisotropic layer A (A).

The optically anisotropic layer B (B) is a polymer film, which has been uniaxially stretched. In the case that the polymer used in the film has a positive birefringence, the direction of stretch corresponds to the direction of the slow axis (b). In the case that the polymer used in the film has a negative birefringence, the direction of stretch is perpendicular to the direction of the slow axis (b).

FIG. 7 schematically illustrates a circularly polarizing plate according to the second embodiment.

The circularly polarizing plate shown in FIG. 7 comprises a linearly polarizing membrane (P), an optically anisotropic layer A (A) and an optically anisotropic layer B (B) in this order.

The linearly polarizing membrane (P) has a polarizing axis (p) in plane. The optically anisotropic layer A (A) has a slow axis (a) in plane, and the optically anisotropic layer B (B) also has a slow axis (b) in plane. The angle (θ1) between the slow axes (a) and (b) is 60°. The angle (θ2) between the slow axis (a) and the polarizing axis (p) is 15°. The angle (θ3) between the slow axis (b) and the polarizing axis (p) is 75°.

FIG. 8 schematically illustrates a reflective liquid crystal display using the second embodiment of a circularly polarizing plate.

The reflective liquid crystal display shown in FIG. 8 comprises a reflector (R), a liquid crystal cell (LC), an optically anisotropic layer B (B), an optically anisotropic layer A (A) and a linearly polarizing membrane (P) in this order.

The linearly polarizing membrane (P) has a polarizing axis (p) in plane. The optically anisotropic layer A (A) has a slow axis (a) in plane, and the optically anisotropic layer B (B) also has a slow axis (b) in plane. The angle (θ1) between the slow axes (a) and (b) is 60°. The angle (θ2) between the slow axis (a) and the polarizing axis (p) is 15°. The angle (θ3) between the slow axis (b) and the polarizing axis (p) is 75°. The liquid crystal cell (LC) has two orientation layers. The orientation layer arranged between the liquid crystal cell (LC) and the optically anisotropic layer B (B) has a rubbing direction (r1). The orientation layer arranged between the reflector (R) and the liquid crystal cell (LC) also has a rubbing direction (r2). The angle (θ4) between the rubbing direction (r1) and the polarizing axis (p) is 45°. The rubbing direction (r2) is parallel with the polarizing axis (p).

FIG. 9 schematically illustrates an optically anisotropic layer A used in the second embodiment of a circularly polarizing plate.

The optically anisotropic layer A (A) shown in FIG. 9 is provided on a transparent support (S).

The optically anisotropic layer A (A) has a slow axis (a) in plane. The transparent support (S) has a lengthwise direction (s). The angle (α) between the lengthwise direction (s) and the slow axis (a) is 75°.

The optically anisotropic layer A (A) is made from discotic liquid crystal molecules (d). The discotic liquid crystal molecules (d) are essentially vertically aligned in the optically anisotropic layer A (A). The directions of the discotic cores of the discotic liquid crystal molecules (d) correspond to the slow axis (a) of the optically anisotropic layer A (A).

Figure 10:
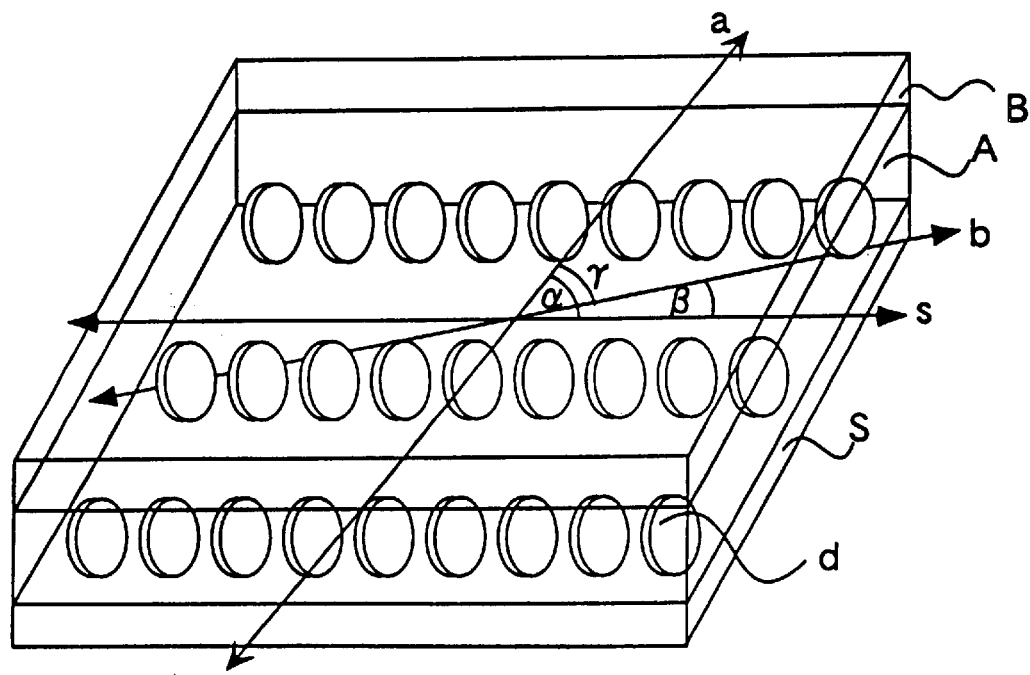

FIG. 10 schematically illustrates a quarter wave plate used in the second embodiment of a circularly polarizing plate.

The quarter wave plate shown in FIG. 10 comprises a transparent support (S), an optically anisotropic layer A (A) and an optically anisotropic layer B (B) in this order.

The optically anisotropic layer A (A) has a slow, axis (a) in plane, and the optically anisotropic layer B (B) also has a slow axis (b) in plane. The transparent support (S) has a lengthwise direction (s). The angle (α) between the lengthwise direction (s) and the slow axis (a) is 75°. The angle (β) between the lengthwise direction (s) and the slow axis (b) is 15°. The angle (γ) between the slow axes (a) and (b) is 60°.

The optically anisotropic layer A (A) is made from discotic liquid crystal molecules (d). The discotic liquid crystal molecules (d) are essentially vertically aligned in the optically anisotropic layer A (A). The directions of the discotic cores of the discotic liquid crystal molecules (d) correspond to the slow axis (a) of the optically anisotropic layer A (A).

The optically anisotropic layer B (B) is a birefringent polymer film.

Figure 11:
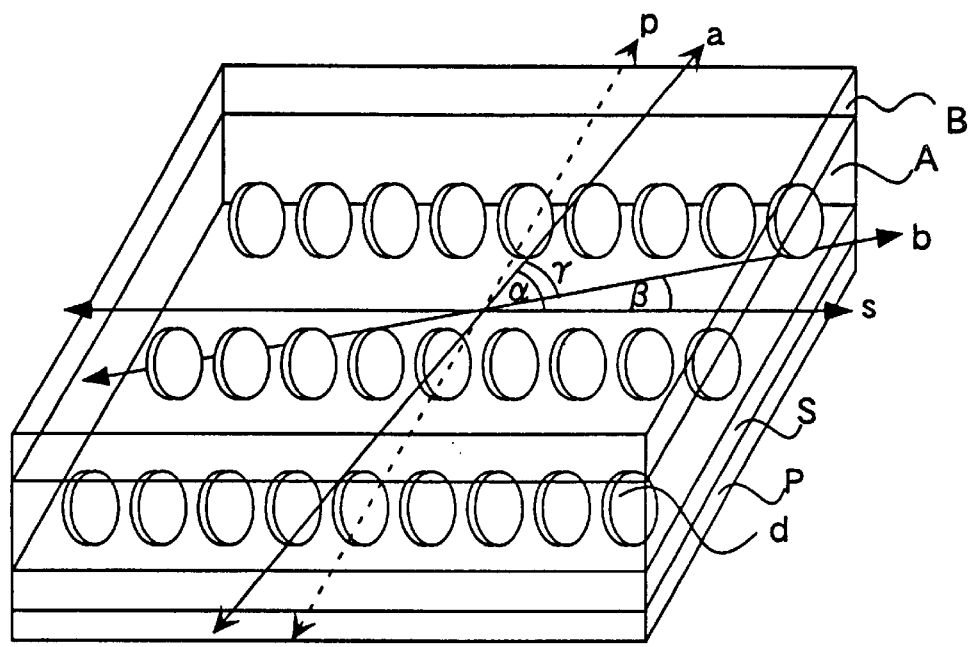

FIG. 11 schematically illustrates a circularly polarizing plate according to the second embodiment.

The circularly polarizing plate shown in FIG. 11 comprises a polarizing membrane (P), a transparent support (S), an optically anisotropic layer A (A) and an optically anisotropic layer B (B) in this order.

The optically anisotropic layer A (A) has a slow axis (a) in plane, and the optically anisotropic layer B (B) also has a slow axis (b) in plane. The transparent support (S) has a lengthwise direction (s). The angle (α) between the lengthwise direction (s) and the slow axis (a) is 75°. The angle (β) between the lengthwise direction (s) and the slow axis (b) is 15°. The angle (γ) between the slow axes (a) and (b) is 60°. The polarizing plate (P) has a polarizing axis (p). The plarizing axis (p) is perpendicular to the lengthwise direction (s).

The optically anisotropic layer A (A) is made from discotic liquid crystal molecules (d). The discotic liquid crystal molecules (d) are essentially vertically aligned in the optically anisotropic layer A (A). The directions of the discotic cores of the discotic liquid crystal molecules (d) correspond to the slow axis (a) of the optically anisotropic layer A (A).

The optically anisotropic layer B (B) is a birefringent polymer film.

Figure 12:
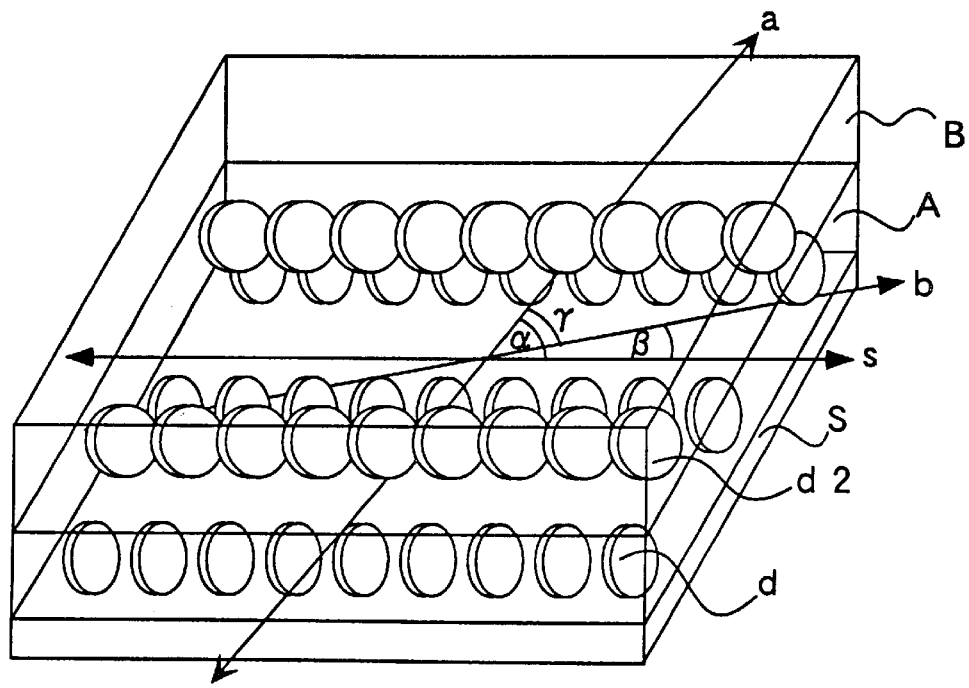

FIG. 12 schematically illustrates a quarter wave plate used in the second embodiment of a circularly polarizing plate.

The quarter wave plate shown in FIG. 12 comprises a transparent support (S), an optically anisotropic layer A (A) and an optically anisotropic layer B (B) in this order.

The optically anisotropic layer A (A) has a slow axis (a) in plane, and the optically anisotropic layer B (B) also has a slow axis (b) in plane. The transparent support (S) has a lengthwise direction (s). The angle (α) between the lengthwise direction (s) and the slow axis (a) is 75°. The angle (β) between the lengthwise direction (s) and the slow axis (b) is 15°. The angle (γ) between the slow axes (a) and (b) is 60°.

The optically anisotropic layer A (A) is made from discotic liquid crystal molecules (d1). The discotic liquid crystal molecules (d1) are essentially vertically aligned in the optically anisotropic layer A (A). The directions of the discotic cores of the discotic liquid crystal molecules (d1) correspond to the slow axis (a) of the optically anisotropic layer A (A).

The optically anisotropic layer B (E) is also made from discotic liquid crystal molecules (d2). The discotic liquid crystal molecules (d2) are essentially vertically aligned in the optically anisotropic layer B (B). The directions of the discotic cores of the discotic liquid crystal molecules (d2) correspond to the slow axis (b) of the optically anisotropic layer B (B).

Figure 13:
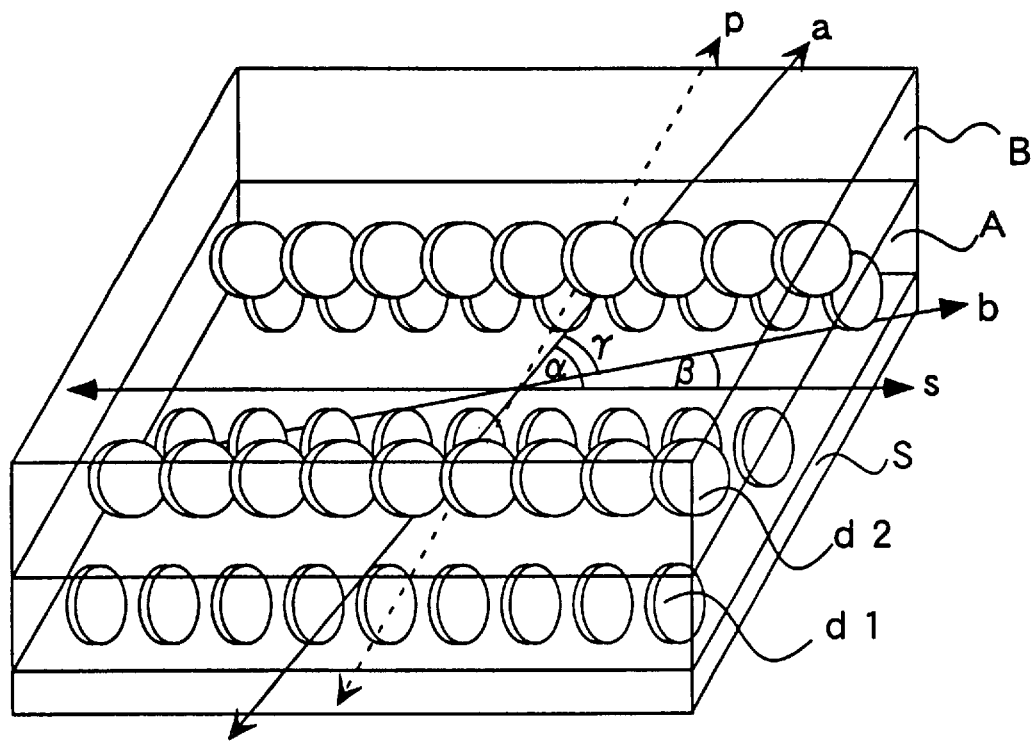

FIG. 13 schematically illustrates a circularly polarizing plate according to the second embodiment.

The circularly polarizing plate shown in FIG. 13 comprises a polarizing membrane (P), a transparent support (S), an optically anisotropic layer A (A) and an optically anisotropic layer B (B) in this order.

The optically anisotropic layer A (A) has a slow axis (a) in plane, and the optically anisotropic layer B (B) also has a slow axis (b) in plane. The transparent support (S) has a lengthwise direction (s). The angle (α) between the lengthwise direction (s) and the slow axis (a) is 75°. The angle (β) between the lengthwise direction (s) and the slow axis (b) is 15°. The angle (γ) between the slow axes (a) and (b) is 60°. The polarizing plate (P) has a polarizing axis (p). The plarizing axis (p) is perpendicular to the lengthwise direction (s).

The optically anisotropic layer A (A) is made from discotic liquid crystal molecules (d1) The discotic liquid crystal molecules (d1) are essentially vertically aligned in the optically anisotropic layer A (A). The directions of the discotic cores of the discotic liquid crystal molecules (d1) correspond to the slow axis (a) of the optically anisotropic layer A (A).

The optically anisotropic layer B (B) is also made from discotic liquid crystal molecules (d2) The discotic liquid crystal molecules (d2) are essentially vertically aligned in the optically anisotropic layer B (B). The directions of the discotic cores of the discotic liquid crystal molecules (d2) correspond to the slow axis (b) of the optically anisotropic layer B (B).

FIG. 14 schematically illustrates an optically anisotropic layer A used in the second embodiment of a circularly polarizing plate.

The optically anisotropic layer A (A) shown in FIG. 14 is provided on a transparent support (S).

The optically anisotropic layer A (A) has a slow axis (a) in plane. The transparent support (S) has a lengthwise direction (s). The angle (α) between the lengthwise direction (s) and the slow axis (a) is 15°.

The optically anisotropic layer A (A) is made from discotic liquid crystal molecules (d). The discotic liquid crystal molecules (d) are essentially vertically aligned in the optically anisotropic layer A (A). The directions of the discotic cores of the discotic liquid crystal molecules (d) correspond to the slow axis (a) of the optically anisotropic layer A (A).

Figure 15:
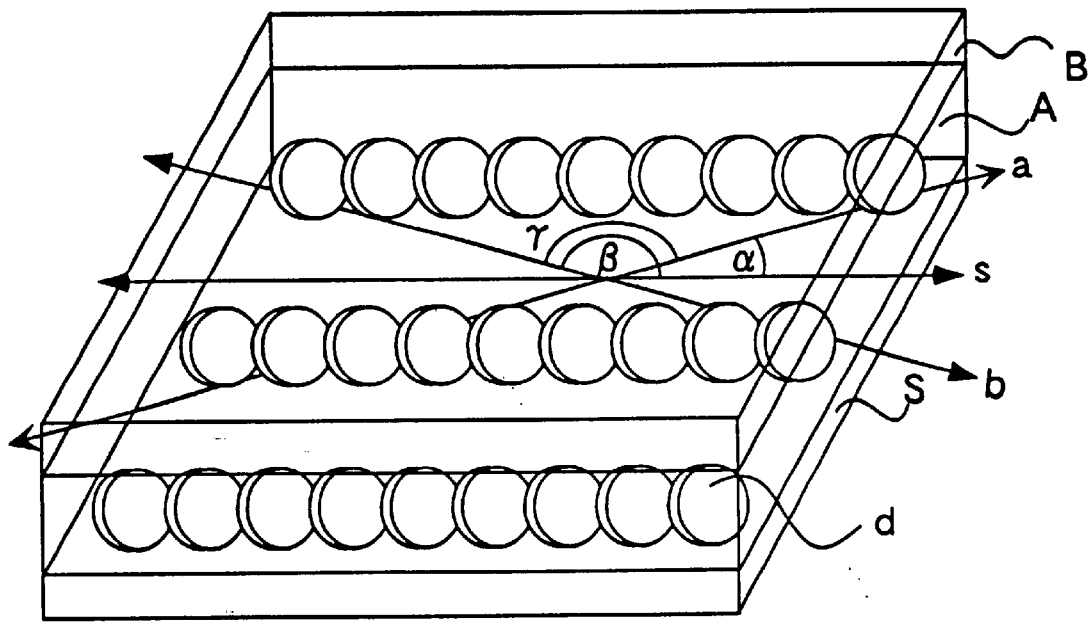

FIG. 15 schematically illustrates a quarter wave plate used in the second embodiment of a circularly polarizing plate.

The quarter wave plate shown in FIG. 15 comprises a transparent support (S), an optically anisotropic layer A (A) and an optically anisotropic layer B (B) in this order.

The optically anisotropic layer A (A) has a slow axis (a) in plane, and the optically anisotropic layer B (B) also has a slow axis (b) in plane. The transparent support (S) has a lengthwise direction (s). The angle (α) between the lengthwise direction (s) and the slow axis (a) is 15°. The angle (β) between the lengthwise direction (s) and the slow axis (b) is 75°. The angle (γ) between the slow axes (a) and (b) is 60°.

The optically anisotropic layer A (A) is made from discotic liquid crystal molecules (d). The discotic liquid crystal molecules (d) are essentially vertically aligned in the optically anisotropic layer A (A). The directions of the discotic cores of the discotic liquid crystal molecules (d) correspond to the slow axis (a) of the optically anisotropic layer A (A).

The optically anisotropic layer B (B) is a birefringent polymer film.

Figure 16:
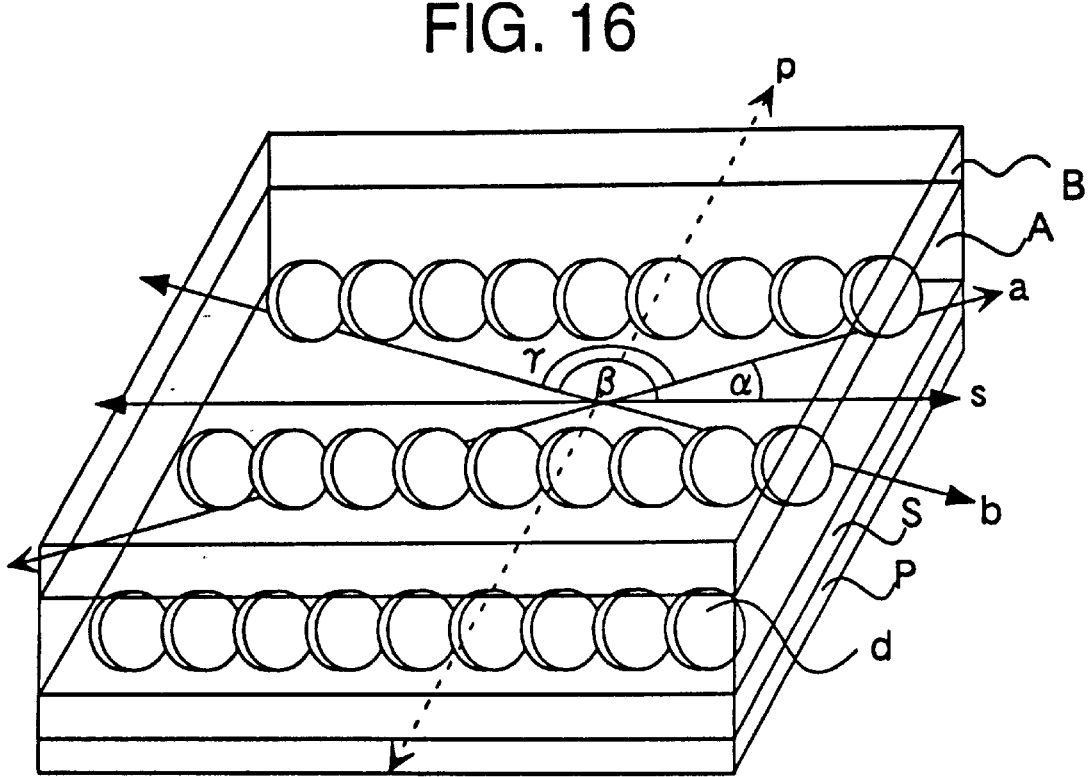

FIG. 16 schematically illustrates a circularly polarizing plate according to the second embodiment.

The circularly polarizing plate shown in FIG. 16 comprises a polarizing membrane (P), a transparent support (S), an optically anisotropic layer A (A) and an optically anisotropic layer B (B) in this order.

The optically anisotropic layer A (A) has a slow axis (a) in plane, and the optically anisotropic layer B (B) also has a slow axis (b) in plane. The transparent support (S) has a lengthwise direction (s). The angle (α) between the lengthwise direction (s) and the slow axis (a) is 15°. The angle (β) between the lengthwise direction (s) and the slow axis (b) is 75°. The angle (γ) between the slow axes (a) and (b) is 60°. The polarizing plate (P) has a polarizing axis (p). The plarizing axis (p) is perpendicular to the lengthwise direction (s).

The optically anisotropic layer A (A) is made from discotic liquid crystal molecules (d) The discotic liquid crystal molecules (d) are essentially vertically aligned in the optically anisotropic layer A (A). The directions of the discotic cores of the discotic liquid crystal molecules (d) correspond to the slow axis (a) of the optically anisotropic layer A (A).

The optically anisotropic layer B (B) is a birefringent polymer film.

Figure 17:
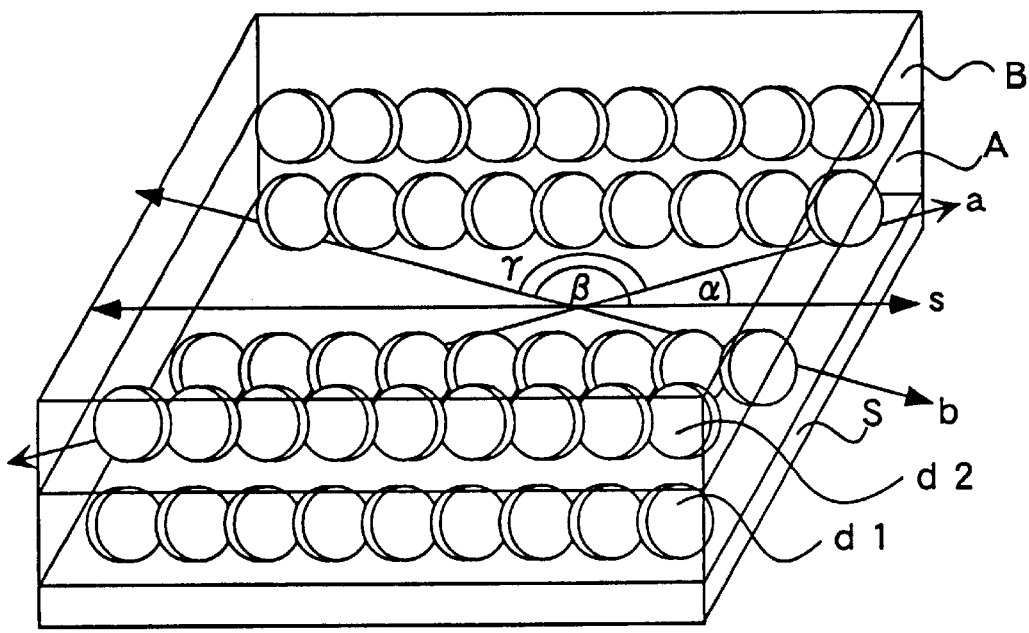

FIG. 17 schematically illustrates a quarter wave plate used in the second embodiment of a circularly polarizing plate.

The quarter wave plate shown in FIG. 17 comprises a transparent support (S), an optically anisotropic layer A (A) and an optically anisotropic layer B (B) in this order.

The optically anisotropic layer A (A) has a slow axis (a) in plane, and the optically anisotropic layer B (B) also has a slow axis (b) in plane. The transparent support (S) has a lengthwise direction (s). The angle (α) between the lengthwise direction (s) and the slow axis (a) is 15°. The angle (β) between the lengthwise direction (s) and the slow axis (b) is 75°. The angle (γ) between the slow axes (a) and (b) is 60°.

The optically anisotropic layer A (A) is made from discotic liquid crystal molecules (d1). The discotic liquid crystal molecules (d1) are essentially vertically aligned in the optically anisotropic layer A (A). The directions of the discotic cores of the discotic liquid crystal molecules (d1) correspond to the slow axis (a) of the optically anisotropic layer A (A).

The optically anisotropic layer B (B) is also made from discotic liquid crystal molecules (d2). The discotic liquid crystal molecules (d2) are essentially vertically aligned in the optically anisotropic layer B (B). The directions of the discotic cores of the discotic liquid crystal molecules (d2) correspond to the slow axis (b) of the optically anisotropic layer B (B).

Figure 18:
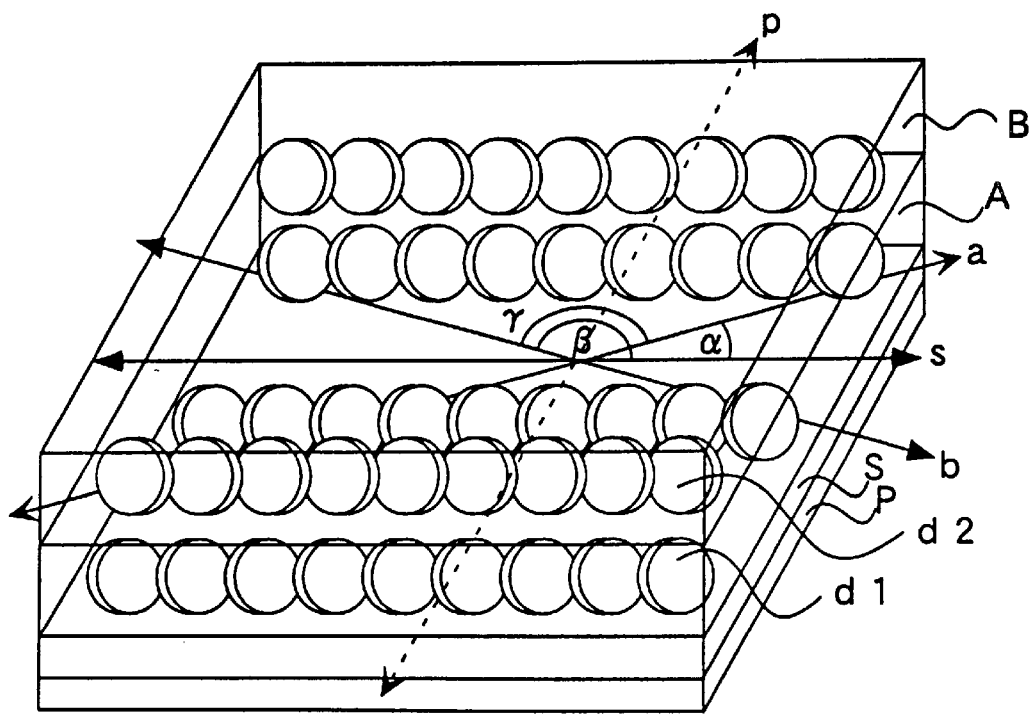

FIG. 18 schematically illustrates a circularly polarizing plate according to the second embodiment.

The circularly polarizing plate shown in FIG. 18 comprises a polarizing membrane (P), a transparent support (S), an optically anisotropic layer A (A) and an optically anisotropic layer B (B) in this order.

The optically anisotropic layer A (A) has a slow axis (a) in plane, and the optically anisotropic layer B (B) also has a slow axis (b) in plane. The transparent support (S) has a lengthwise direction (s). The angle (α) between the lengthwise direction (s) and the slow axis (a) is 15°. The angle (β) between the lengthwise direction (s) and the slow axis (b) is 75°. The angle (γ) between the slow axes (a) and (b) is 60°. The polarizing plate (P) has a polarizing axis (p). The plarizing axis (p) is perpendicular to the lengthwise direction (s).

The optically anisotropic layer A (A) is made from discotic liquid crystal molecules (d1). The discotic liquid crystal molecules (d1) are essentially vertically aligned in the optically anisotropic layer A (A). The directions of the discotic cores of the discotic liquid crystal molecules (d1) correspond to the slow axis (a) of the optically anisotropic layer A (A).

The optically anisotropic layer B (B) is also made from discotic liquid crystal molecules (d2). The discotic liquid crystal molecules (d2) are essentially vertically aligned in the optically anisotropic layer B (B). The directions of the discotic cores of the discotic liquid crystal molecules (d2) correspond to the slow axis (b) of the optically anisotropic layer B (B).

[Optically Anisotropic Layer Made of Polymer Film]

An optically anisotropic polymer film is made from a polymer. Examples of the polymers include polyolefin (e.g., polyethylene, polypropylene, a norbornene polymer), polycarbonate, polyarylate, polysulfone, polyvinyl alcohol, polymethacrylic ester, polyacrylic ester and cellulose ester. A copolymer or a mixture of polymers can also be used.

An optical anisotropy of a polymer film is preferably obtained by stretching the film. The film is preferably uniaxially stretched. A longitudinal stretching process is preferably conducted by using two or more rolls of different rotating speeds. A latitudinal stretching process is preferably conducted by using tenters, which grip and pull both sides of the film.

The optically anisotropic layer can comprise two or more films provided that the total optical characteristic of the two or more films should satisfy the optical characteristic of the optically anisotropic layer.

In the case that the polymer has a positive birefringence, the direction of stretch corresponds to the direction of the slow axis. In the case that the polymer has a negative birefringence, the direction of stretch is perpendicular to the direction of the slow axis.

The polymer film is preferably prepared according to a solvent casting method to obtain uniform birefringence.

The polymer film has a thickness preferably in the range of 20 to 500 nm, more preferably in the range of 50 to 200 nm, and most preferably in the range of 50 to 100 nm.

[Optically Anisotropic Layer Made from Liquid Crystal Molecules]

A liquid crystal molecule preferably is a rod-like liquid crystal molecule or a discotic liquid crystal molecule, and more preferably is a discotic liquid crystal molecule.

The liquid crystal molecules are preferably uniformly aligned in an optically anisotropic layer, more preferably fixed in the optically anisotropic layer while keeping the uniform alignment, and most preferably fixed by a polymerization reaction.

In the case that rod-like liquid crystal molecules are used, the molecules are preferably homogeneously aligned. An average inclined angle of the rod-like liquid crystal molecule is preferably in the range of 0° to 40°. The inclined angle of the rod-like liquid crystal molecule means an angle between a long axis of a rod-like liquid crystal molecule and a surface plane of an optically anisotorpic layer.

Examples of the rod-like liquid crystal molecules incdude azomethines, azoxys, cyanobiphenyls, cyanophenyl esters, benzoic esters, phenyl cyclohexanecarboxylates, cyanophenylcyclohexanes, cyanophenylpyridines, alkoxylphenylpyridines, alkoxhenylpyrimidines, phenyldioxanes, tolanes and alkenylcyclohexylbenzonitriles. A polymer of a rod-like liquid crystal molecule can also be used in an optically anisotropic layer.

In the case that disctic liquid crystal molecules are used, the molecules are preferably vertically aligned. An average inclined angle of the discotic liquid crystal molecule is preferably in the range of 50° to 90°. The inclined angle of the discotic liquid crystal molecule means an angle between a plane of a discotic core of a discotic liquid crystal molecule and a surface plane of an optically anisotorpic layer. The discotic liquid crystal molecules can also be obliquely aligned (an oblique alignment). The inclined angle of the discotic liquid crystal molecule can be changed according to the distance from an orientation layer (a hybrid alignment). The average inclined angle is preferably in the range of 50° to 90°, even if discotic liquid crystal molecules are aligned according to the oblique alignment or the hybrid alignment.

The discotic liquid crystal molecule is described in various documents (C. Destrade et al, Mol. Crysr. Liq. Cryst., vol. 71, page 111 (1981); Japan Chemical Society, Quarterly Chemical Review (written in Japanese), chapter 5 and chapter 10, section 2 (1994); B. Kohne et al., Angew. Chem. Soc. Chem. Comm., page 1794 (1985); and J. Zhang et al., J. Am. Chem. Soc., vol. 116, page 2655 (1994)). The polymerization reaction of the discotic liquid crystal molecule is described in Japanese Patent Provisional Publication No. 8(1996)-27284.

A polymerizable group should be bound to a discotic core of the discotic liquid crystal molecule to cause the polymerization reaction. However, if the polymerizable group is directly bound to the discotic cores it is difficult to keep the alignment at the polymerization reaction. Therefore, a linking group is introduced between the discotic core and the polymerizable group. Accordingly, the discotic liquid crystal molecule having a polymerizable group (polymerizable discotic liquid crystal molecule) preferably is a compound represented by the following formula.

$$D(\text{—L—Q})_n$$

in which D is a discotic core; L is a divalent linking group; Q is a polymerizable group; and n is an integer of 4 to 12.

Examples of the discotic cores (D) are shown below. In the examples, LQ (or QL) means the combination of the divalent linking group (L) and the polymerizable group (Q).

(D1)

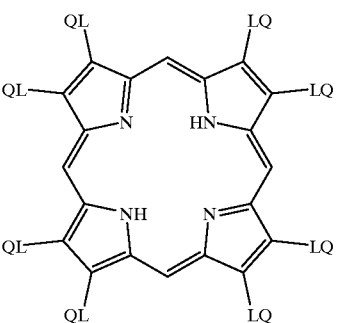

(D2)

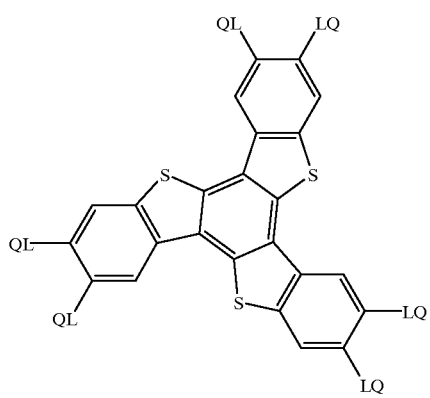

(D3)

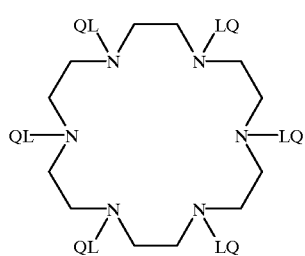

(D4)

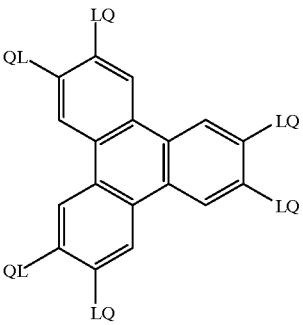

(D5)

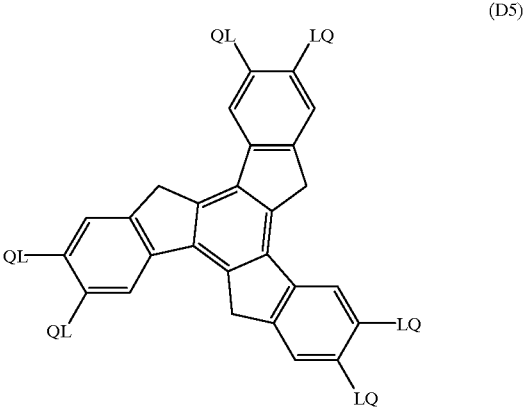

(D6)

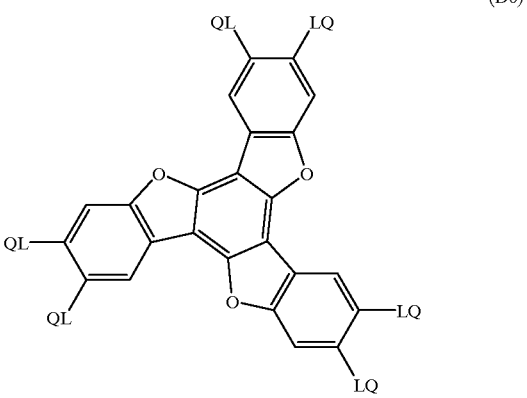

(D7)

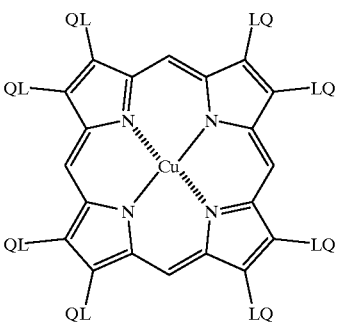

(D8)

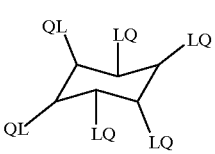

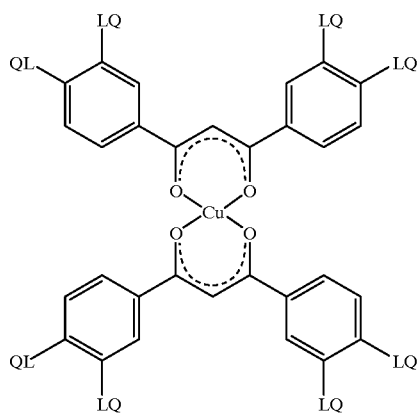
(D9)
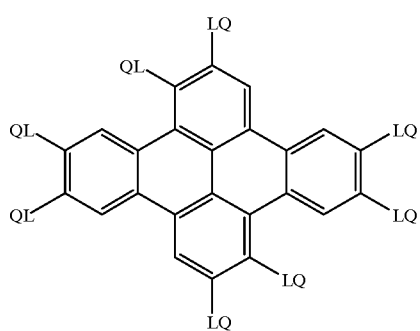
(D10)
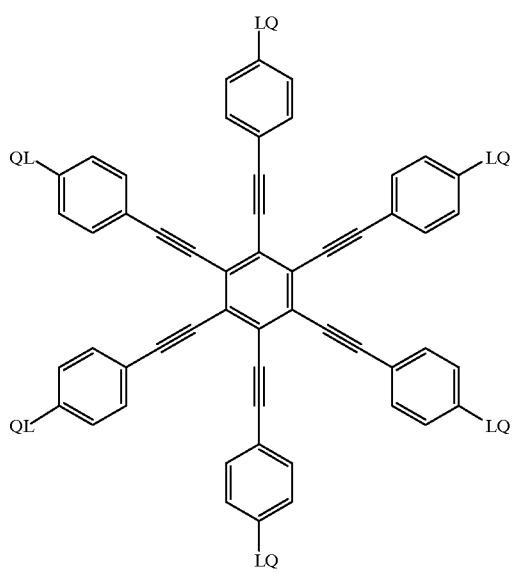
(D11)
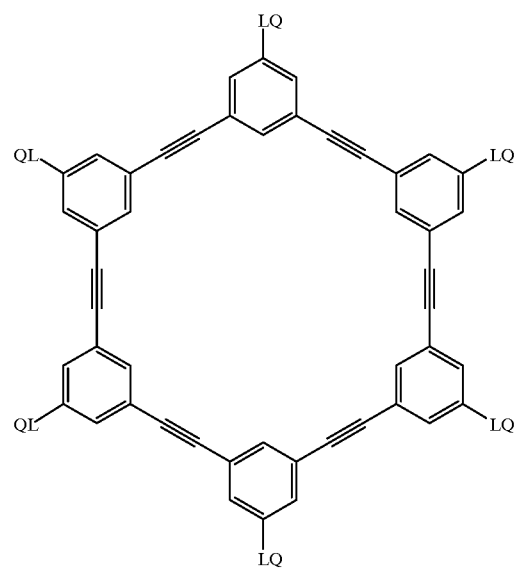
(D12)
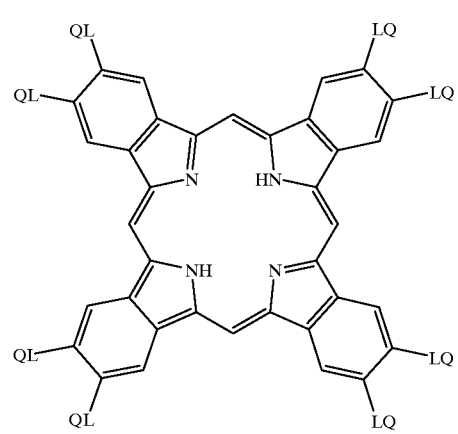
(D13)
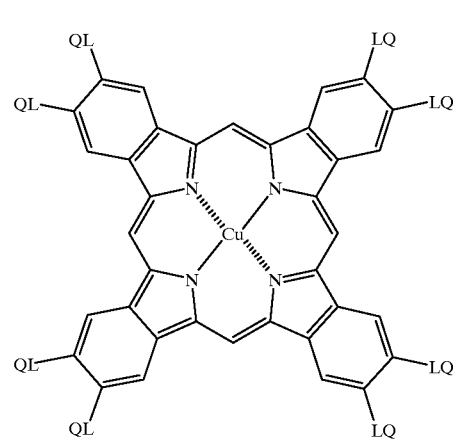
(D14)

(D15)

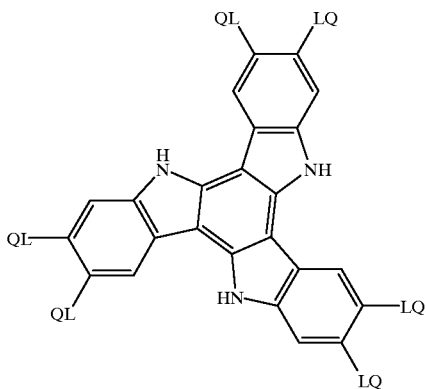

In the formula, the divalent linking group (L) preferably is selected from the group consisting of an alkylene group, an alkenylene group, an arylene group, —CO, —NH—, —O—, —S— and combinations thereof. L more preferably is a divalent linking group comprising at least two divalent groups selected from the group consisting of an alkylene group, an arylene group, —CO—, —Ni—, —O— and —S—. L more preferably is a divalent linking group comprising at least two divalent groups selected from the group consisting of an alkylene group, an arylene group, —CO— and —O—. The alkylene group preferably has 1 to 12 carbon atoms. The alkenylene group preferably has 2 to 12 carbon atoms. The arylene group preferably has 6 to 10 carbon atoms. The alkylene group, the alkenylene group and the arylene group can have a substituent group (such as an alkyl group, a halogen atom, cyano, an alkoxy group, an acyloxy group).

Examples of the divalent linking groups (L) are shown below. In the examples, the left side is attached to the discotic core (D), and the right side is attached to the polymerizable group (Q). The AL means an alkylene group or an alkenylene group. The AR means an arylene group.

L1: —AL—CO—O—AL—O—CO—
L2: —AL—CO—O—AL—O—
L3: —AL—CO—O—AL—O—AL—
L4: —AL—CO—O—AL—O—CO—
L5: —CO—AR—O—AL—
L6: —CO—AR—O—AL—O—
L7: —CO—AR—O—AL—O—CO—
L8: —CO—NH—AL—
L9: —NH—AL—O—
L10: —NH—AL—O—CO—
L11: —O—AL—
L12: —O—AL—O—
L13: —O—AL—C—CO—
L14: —O—AL—O—CO—NH—AL—
L15: —O—AL—S—AL—
L16: —O—CO—AL—AR—O—AL—O—CO—
L17: —O—CO—AR—C—AL—CO—
L18: —O—CO—AR—O—AL—O—CO—
L19: —O—CO—AR—O—AL—O—AL—O—CO—
L20: —O—CO—AR—O—AL—O—AL—O—CO—
L21: —S—AL—
L22: —S—AL—O—
L23: —S—AL—C—CO—
L24: —S—AL—S—AL—
L25: —S—AR—AL—

In the case that the liquid crystal molecules of the optically anisotropic layer A are twisted at a twist angle in the range of 3° to 45°, asymmetric carbon atom can be introduced into the discotic liquid crystal molecules, preferably into AL (an alkylene group or an alkenylene group) of the divalent linking group (L). Examples of AL* containing asymmetric carbon atoms are shown below. In the examples, the left side is adjacent to the discotic core (D), and the right side is adjacent to the polymerizable group (Q). The carbon atom (C) with the mark (*) is the asymmetric carbon atom. The optical activity can be S or R.

AL*1: —CH$_2$CH$_2$C*HCH$_3$—CH$_2$CH$_2$CH$_2$—
AL*2: —C$_2$CH$_2$CH$_2$—C*HCH$_3$—CH$_2$CH$_2$—
AL*3: —CH$_2$—C*HCH$_3$—CH$_2$CH$_2$CH$_2$CH$_2$—
AL*4: —C*HCH$_3$—CH$_2$CH$_2$CH$_2$CH$_2$CH$_2$—
AL*5: —CH$_2$CH$_2$CH$_2$CH$_2$—C*HCH$_3$—CH$_2$—
AL*6: —CH$_2$CH$_2$CH$_2$CH$_2$CH$_2$—C*HCH$_3$—
AL*7: —C*HCH$_3$—CH$_2$CH$_2$CH$_2$CH$_2$—
AL*8: —CH$_2$—C*HCH$_3$—CH$_2$CH$_2$CH$_2$—
AL*9: —CH$_2$CH$_2$—C*HCH$_3$—CH$_2$CH$_2$—
AL*10: —CH$_2$CH$_2$CH$_2$—C*HCH$_3$—CH$_2$—
AL*11: —CH$_2$CH$_2$CH$_2$CH$_2$—C*HCH$_3$—
AL*12: —C*HCH$_3$—CH$_2$CH$_2$CH$_2$—
AL*13: —CH$_2$—C*HCH$_3$—CH$_2$CH$_2$—
AL*14: —CH$_2$CH$_2$—C*HCH$_3$—CH$_2$—
AL*15: —CH$_2$CH$_2$CH$_2$—C*HCH$_3$—
AL*16: —CH$_2$—C*HCH$_3$—
AL*17: —C*HCH$_3$—CH$_2$—
AL*18: —C*HCH$_3$—CH$_2$CH$_2$CH$_2$CH$_2$CH$_2$—
AL*19: —CH$_2$—C*HCH$_3$—CH$_2$CH$_2$CH$_2$CH$_2$CH$_2$—
AL*20: —CH$_2$CH$_2$—C*HCH$_3$—CH$_2$CH$_2$CH$_2$CH$_2$—
AL*21: —CH$_2$CH$_2$CH$_2$—C*HCH$_3$—CH$_2$CH$_2$CH$_2$—
AL*22: —C*HCH$_3$—CH$_2$CH$_2$CH$_2$CH$_2$CH$_2$CH$_2$CH$_2$—
AL*23: —CH$_2$—C*HCH$_3$—CH$_2$CH$_2$CH$_2$CH$_2$CH$_2$CH$_2$—
AL*24: —CH$_2$CH$_2$—C*HCH$_3$—CH$_2$CH$_2$CH$_2$CH$_2$CH$_2$—
AL*25: —CH$_2$CH$_2$CH$_2$—C*HCH$_3$—CH$_2$CH$_2$CH$_2$CH$_2$—
AL*26: —C*HCH$_3$—CH$_2$CH$_2$CH$_2$CH$_2$CH$_2$CH$_2$CH$_2$CH$_2$—
AL*27: —CH$_2$—C*HCH$_3$—CH$_2$CH$_2$CH$_2$CH$_2$CH$_2$CH$_2$CH$_2$CH$_2$—
AL*28: —CH$_2$—C*HCH$_2$CH$_3$—
AL*29: —CH$_2$—C*HCH$_2$CH$_3$—CH$_2$—
AL*30: —CH$_2$—C*HCH$_2$CH$_3$—CH$_2$CH$_2$—
AL*31: —CH$_2$—C*HCH$_2$CH$_3$—CH$_2$CH$_2$CH$_2$—
AL*32: —CH$_2$—C*H(n-C$_3$H$_7$)—CH$_2$CH$_2$—
AL*33: —CH$_2$—C*H(n-C$_3$H$_7$)—CH$_2$CH$_2$CH$_2$CH$_2$—
AL*34: —CH$_2$—C*H(OCOCH$_3$)—CH$_2$CH$_2$—
AL*35: —CH$_2$—C*H(OCOCH$_3$)—CH$_2$CH$_2$CH$_2$CH$_2$—
AL*36: —CH$_2$—C*HF—CH$_2$CH$_2$—
AL*37: —CH$_2$—C*HF—CH$_2$CH$_2$CH$_2$CH$_2$—
AL*38: —CH$_2$C*HCl—CH$_2$CH$_2$—
AL*39: —CH$_2$—C*HCl—CH$_2$CH$_2$CH$_2$CH$_2$—
AL*40: —CH$_2$—C*HOCH$_3$—CH$_2$CH$_2$—

AL*41: —CH₂—C*HOCH₃—CH₂CH₂CH₂CH₂—
AL*42: —CH₂—C*HCN—CH₂CH₂—
AL*43: —CH₂—C*HCN—CH₂CH₂CH₂CH₂—
AL*44: —CH₂—C*HCF₃—CH₂CH₂—
AL*45: —CH₂—C*HCF₃—CH₂CH₂CH₂CH₂—

The polymerizable group (Q) is determined by the polymerization reaction. Examples of the polymerizable groups (Q) are shown below.

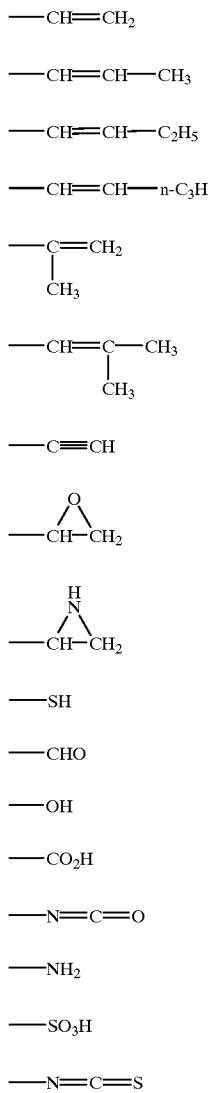

The polymerizable group (Q) preferably is an unsaturated polymerizable group (Q1 to Q7), an epoxy group (Q8) or an aziridinyl group (Q9), more preferably is an unsaturated polymerizable group, and most preferably is an ethylenically unsaturated group (Q1 to Q6).

In the formula, n is an integer of 4 to 12, which is determined by the chemical structure of the discotic core (D). The 4 to 12 combinations of L and Q can be different from each other. However, the combinations are preferably identical.

Two or more discotic liquid crystal molecules can be used in combination. For example, a molecule containing asymmetric carbon atom in the divalent linking group (L) can be used in combination with a molecule containing no asymmetric carbon atom. Further, a molecule having a polymerizable group (Q) can be used in combination with a molecule having no polymerizable group.

The discotic liquid crystal molecule having no polymerizable group is obtained by replacing the polymerizable group (Q) of the above-described polymerizable discotic liquid crystal molecule with hydrogen or an alkyl group. Accordingly, the discotic liquid crystal molecule having no polymerizable group preferably is a compound represented by the following formula.

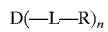

D(—L—R)ₙ in which D is a discotic core; L is a divalent linking group; R is hydrogen or an alkyl group; and n is an integer of 4 to 12.

Examples of the discotic cores are the same as the examples of the cores in the polymerizable discotic liquid crystal molecule, except that LQ or QL is replaced with LR or RL.

Examples of the divalent linking groups are also the same as the examples of the linking groups in the polymerizable discotic liquid crystal molecule.

The alkyl group of R contains preferably 1 to 40 carbon atoms, and more preferably 1 to 30 carbon atoms. An alkyl group preferably has a chain structure rather than a cyclic structure. An alkyl group having a straight chain (normal alkyl group) is preferred to a branched alkyl group. R preferably is hydrogen or a normal alkyl group having 1 to 30 carbon atoms.

In place of introducing asymmetric carbon atom into the divalent linking group (L) of the discotic liquid crystal molecule, the discotic liquid crystal molecules can also be twisted by adding an optical active compound containing asymmetric carbon atom (chiral agent) into the optically anisotropic layer. Various natural or synthetic optical active compounds can be used as the chiral agent. The chiral agent can have a polymerizable group, which is the same as or similar to the polymerizable group of the discotic liquid crystal compound. The discotic liquid crystal molecules are fixed in the optically anisotropic layer by a polymerization reaction after the molecules are essentially vertically (homogeneously) aligned. The chiral agent having a polymerizable group can also be fixed by the same or a similar polymerization reaction.

Examples of the chiral agents are shown below. Each of (C-1), (C-3) and (C-4) is an agent for counterclockwise twist. Each of (C-2) and (C-5) is an agent for clockwise twist.

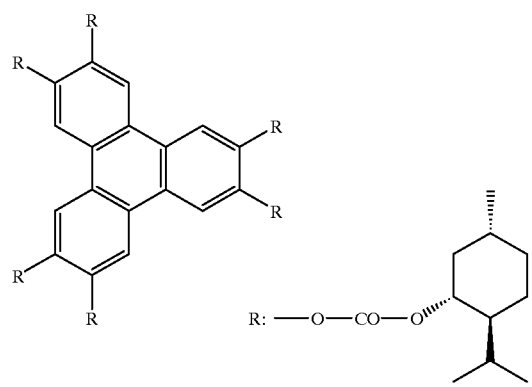

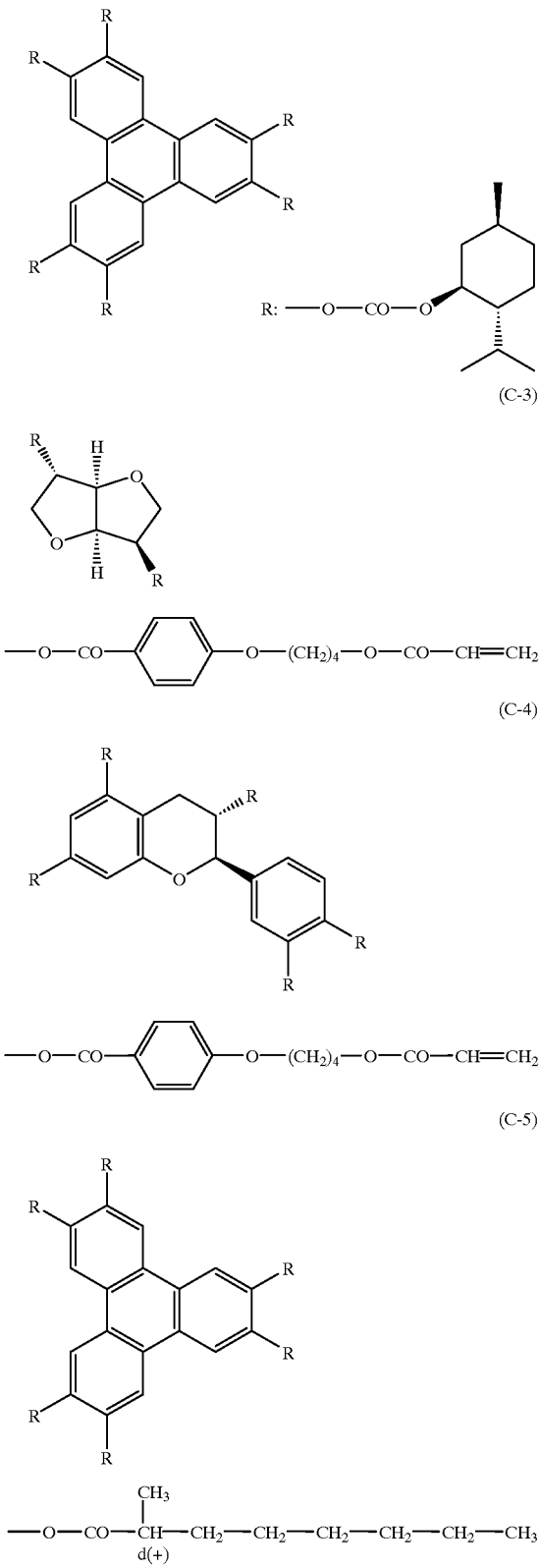

The optically anisotropic layer can further contain a cellulose ester, which has a function of uniformly and essentially vertically (homogeneously) aligning discotic liquid crystal molecules placed near an interface between the layer and the air.

The cellulose ester preferably is a cellulose ester of a lower fatty acid.

The term "lower fatty acid" of the cellulose ester means a fatty acid having 1 to 6 carbon atoms. The lower fatty acid preferably has 2 to 5 carbon atoms, and more preferably has 2 to 4 carbon atoms. The fatty acid may have a substituent group (e.g., hydroxyl). Two or more fatty acids may form an ester with cellulose acetate. Examples of the cellulose esters of the lower fatty acids include cellulose acetate, cellulose propionate, cellulose butyrate, cellulose hydroxypropionate, cellulose acetate propionate and cellulose acetate butyrate. Cellulose acetate butyrate is particularly preferred. Butyric acid content of the cellulose acetate butyrate is preferably not less than 30%, more preferably in the range of 30 to 80%. Acetic acid content of the cellulose acetate butyrate is preferably less than 30%, and more preferably in the range of 1 to 30%.

The coating amount of the cellulose ester is preferably in the range of 0.005 to 0.5 g per $m^2$, more preferably in the range of 0.01 to 0.45 g per $m^2$, further preferably in the range of 0.02 to 0.4 g per $m^2$, and most preferably in the range of 0.03 to 0.35 g per $m^2$. The amount of the cellulose ester is also preferably in the range of 0.1 to 5 wt. % based on the amount of the discotic liquid crystal molecule.

An optically anisotropic layer can be formed by coating a solution containing the liquid crystal molecule and optional components such as the chiral agent, the above-mentioned cellulose ester, a polymerization initiator (described below) on an orientation layer.

A solvent for the preparation of the solution preferably is an organic solvent. Examples of the organic solvents include amides (eg.g, dimethylformamide), sulfoxides (e.g., dimethylsulfoxide), heterocyclic compounds (e.g., pyridine), hydrocarbons (e.g., benzene, hexane), alkyl halides (e.g., chloroform, dichloromethane), esters (e.g., methyl acetate, butyl acetate), ketones (e.g., acetone, methyl ethyl ketone) and ethers (e.g., tetrahydrofuran, 1,2-dimethoxyethane). Alkyl halides and ketones are preferred. Two or more organic solvents can be used in combination.

The solution can be coated according to a conventional coating method such as an extrusion coating method, a direct gravure coating method, a reverse gravure coating method, a die coating method or a bar coating method.

The aligned liquid crystal molecules are preferably fixed while keeping the essentially vertical (homogeneous) alignment. The discotic liquid crystal molecules are fixed preferably by a polymerization reaction of the polymerizable groups (Q) in the molecules. The polymerization reaction can be classified a thermal reaction using a thermal polymerization initiator and a photo reaction using a photo polymerization initiator. A photo polymerization reaction is preferred.

Examples of the photo polymerization initiators include α-carbonyl compounds (described in U.S. Pat. Nos. 2,367,661, 2,367,670), acyloin ethers (described in U.S. Pat. No. 2,448,828), α-hydrocarbon substituted acyloin compounds (described in U.S. Pat. No. 2,722,512), polycyclic quinone compounds (described in U.S. Pat. Nos. 2,951,758, 3,046,127), combinations of triarylimidazoles and p-aminophenyl ketones (described in U.S. Pat. No. 3,549,367), acridine or phenazine compounds (described in Japanese Patent Provisional Publication No. 60(1985)-105667 and U.S. Pat. No. 4,239,850) and oxadiazole compounds (described in U.S. Pat. No. 4,212,970).

The amount of the photo polymerization initiator is preferably in the range of 0.01 to 20 wt. %, and more preferably in the range of 0.5 to 5 wt. % based on the solid content of the coating solution of the layer.

The light irradiation for the photo polymerization is preferably conducted by an ultraviolet ray.

The exposure energy is preferably in the range of 20 to 5,000 mJ per cm$^2$, and more preferably in the range of 100 to 800 mJ per cm$^2$. The light irradiation can be conducted while heating the layer to accelerate the photo polymerization reaction.

The optically anisotropic layer has a thickness preferably in the range of 0.1 to 10 μm, more preferably in the range of 0.5 to 5 μm, and most preferably in the range of 1 to 5 μm.

[Orientation Layer]

Liquid crystal molecules can be essentially vertically aligned by a function of a side chain (rather than a main chain) of a polymer contained in an orientation layer. A functional group of the side chain decreases a surface energy of the orientation layer to erect a liquid crystal molecule. A hydrocarbon group containing 10 to 100 carbon atoms can be effectively used as the functional group. Fluorine atom can also be effectively used as the functional group. The hydrocarbon group or fluorine atom is introduced into a side chain of a polymer to arrange the group or the atom on the surface of the orientation layer.

The hydrocarbon group is an aliphatic group, an aromatic group or a combination thereof. The aliphatic group can have a branched or cyclic structure. The aliphatic group preferably is an alkyl group (including a cycloalkyl group) or an alkenyl group (including a cycloalkenyl group). The hydrocarbon group can have a substituent group that is not strongly hydrophilic, such as a halogen atom. The hydrocarbon group contains 10 to 100 carbon atoms, preferably 10 to 60 carbon atoms, and more preferably 10 to 40 carbon atoms.

The polymer having a hydrocarbon side chain containing 10 to 100 carbon atoms preferably further has a steroid structure in its side chain or its main chain. The steroid structure present in the side chain is included in the hydrocarbon side chain containing 10 to 100 carbon atoms. Therefore, the steroid structure in the side chain has a function of aligning discotic liquid crystal molecules essentially vertically. In the present specification, the steroid structure means a cyclopentanohydrophenanthrene ring or a ring obtained by replacing a single bond of the cyclopentanohydrophenanthrene ring with a double bond so long as the ring is aliphatic (not forming an aromatic ring).

The fluoropolymer contains fluorine atoms preferably in an amount of 0.05 to 80 wt. %, more preferably in an amount of 0.1 to 70 wt. %, further preferably in an amount of 0.5 to 65 wt. %, and most preferably in an amount of 1 to 60 wt. %.

The polymer of the orientation layer preferably has a main chain of a polyimide structure or a polyvinyl alcohol structure.

The polyimide is usually synthesized by a condensation reaction of a tetracarboxylic acid and diamine. Two or more tetracarboxylic acids or two or more diamines can be used to synthesize a copolymerized polyimide. The hydrocarbon group containing 10 to 100 carbon atoms can be present in repeating units derived from the tetracarboxylic acids, in repeating units derived from the diamines, or in both of the repeating units. The fluorine atom can also be present in the tetracarboxylic acid repeating units, in the diamine repeating units or in both of the repeating units.

A denatured polyvinyl alcohol having a hydrocarbon group comprises hydrocarbon repeating units preferably in an amount of 2 to 80 mol %, and more preferably in an amount of 3 to 70 mol %. The repeating unit has a hydrocarbon group containing 10 to 100 carbon atoms.

A preferred denatured polyvinyl alcohol having a hydrocarbon group is represented by the formula (PVc):

   (PVc)

in which VAl is a vinyl alcohol repeating unit; Hyc is a repeating unit having a hydrocarbon group containing 10 to 100 carbon atoms; VAc is a vinyl acetate repeating unit; x is 20 to 90 mol % (preferably 25 to 90 mol %); y is 2 to 80 mol % (preferably 3 to 70 mol %); and z is 0 to 30 mol % (preferably 2 to 20 mol %).

Preferred repeating units having a hydrocarbon group containing 10 to 100 carbon atoms (HyC) are represented by the formulas (Hyc-I) and (HyC-II):

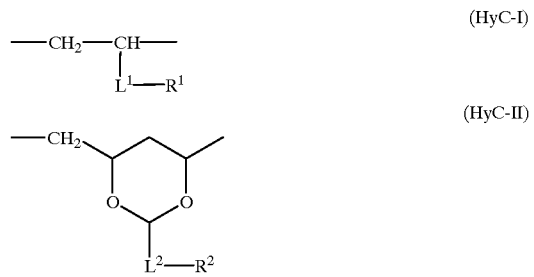

in which L$^1$ is a divalent linking group selected from the group consisting of —O—, —CO—, —SO$_2$—, —NH—, -alkylene-, -arylene- and a combination thereof; L$^2$ is a single bond or a divalent linking group selected from the group consisting of —O—, —CO—, —SO$_2$—, —NH—, -alkylene-, -arylene- and a combination thereof; and each of R$^1$ and R$^2$ is a hydrocarbon group containing 10 to 100 carbon atoms.

Examples of the divalent linking groups formed by the combinations, are shown below.

L1: —O—CO—
L2: —O—CO-alkylene-O—
L3: —O—CO-alkylene-CO—NH—
L4: —O—CO-alkylene-NH—SO$_2$-arylene-O—
L5: -arylene-NH—CO—
L6: -arylene-CO—O—
L7: -arylene-CO—NH—
L8: -arylene-O—
L9: -O—CO—NH-arylene-NH—CO—
L10: —O—CO—O—
L11: —O—SO$_2$—
L12: —O—CO—NH-arylene-O—
L13: —O—CO—O-alkylene-CO—
L14: -alkylene-CO—O—
L15: —O—CO—NH-alkylene-NH—CO—O—
L16: —O—CO—NH-arylene-CO—(O-alkylene-)$_n$—O—

(n: an integer of 1 to 10)

A denatured polyvinyl alcohol containing fluorine atoms comprises repeating units containing fluorine atoms preferably in an amount of 0.05 to 80 mol %, and more preferably in an amount of 0.5 to 70 mol %.

A preferred denatured polyvinyl alcohol containing fluorine atoms is represented by the formula (PVf):

   (PVf)

in which VAl is a vinyl alcohol repeating unit; FRU is a repeating unit containing fluorine atoms; VAc is a vinyl acetate repeating unit; x is 20 to 99 mol % (preferably 24 to 98 mol %); y is 0.05 to 80 mol % (preferably 0.5 to 70 mol %); and z is 0 to 30 mol % (preferably 2 to 20 mol %).

Preferred repeating units containing fluorine atoms (FRU) are represented by the formulas (FRU-I) and (FRU-II)

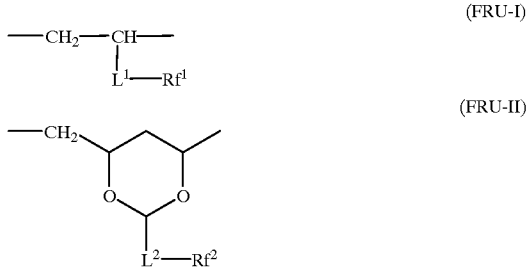

in which $L^1$ is a divalent linking group selected from the group consisting of —O—, —CO—, —O$_2$—, —NH—, -alkylene-, -arylene- and a combination thereof; $L^2$ is a single bond or a divalent linking group selected from the group consisting of —O—, —CO—, —SO$_2$—, —NH—, -alkylene-, -arylene- and a combination thereof; and each of $Rf^1$ and $Rf^2$ is a hydrocarbon group substituted with fluorine atom.

The alkylene group and the arylene group can be substituted with fluorine atom.

Examples of the divalent linking groups formed by the combinations are the same as the examples described in the formulas (HyC-I) and (HyC-II).

The polymer used in the orientation layer has a polymerization degree preferably in the range of 200 to 5,000, and more preferably in the range of 300 to 3,000. The polymer has a molecular weight preferably in the range of 9,000 to 200,000, and more preferably in the range of 13,000 to 130,000.

Two or more polymers can be used in combination.

The orientation layer has a thickness preferably in the range of 0.1 to 10 μm.

The orientation layer is preferably formed by rubbing the polymer layer. The rubbing treatment can be conducted by rubbing a layer with a paper or cloth several times along a certain direction.

After aligning liquid crystal molecules by the orientation layer, the alignment of the liquid crystal molecules can be kept without the orientation layer. For example, an aligned optically anisotropic layer (without the orientation layer) can be transferred on a transparent support to prepare a circularly polarizing plate.

[Transparent Support]

The circularly polarizing plate can further comprise a transparent support. The transparent support is preferably made of a polymer film, which more preferably has a small wavelength dependency. The transparent support also preferably has a small optical anisotropy. The term transparent means that light transmittance is not less than 80%. The term "small wavelength dependency" means that the ratio of Re400 to Re700 is less than 1.2. The term "small optical anisotropy" means that the retardation in plane (Re) is not more than 20 nm (preferably not more than 10 nm).

A transparent support having a lengthwise direction is usually in the form of a roll or a rectangular sheet. After forming an optically anisotropic layer, the roll of the support can be cut into pieces.

Examples of the polymers include polyolefin (e.g., polyethylene, polypropylene, a norbornene polymer), polycarbonate, polyarylate, polysulfone, polyvinyl alcohol, polymethacrylic ester, polyacrylic ester and cellulose ester. Cellulose ester is preferred, cellulose acetate is more preferred, and cellulose triacetate is most preferred. The polymer film is preferably formed according to a solvent casting method.

The transparent support has a thickness preferably in the range of 20 to 500 μm, and more preferably in the range of 50 to 200 μm.

The transparent support can be subjected to a surface treatment (e.g., glow discharge treatment, corona discharge treatment, ultraviolet (UV) treatment, flame treatment) to improve adhesion to a layer formed on the support (e.g., adhesive layer, orientation layer, optically anisotropic layer). An adhesive layer (undercoating layer) can be provided on the transparent support.

[Linearly Polarizing Membrane]

The linearly polarizing membrane can be classified into an iodine type polarizing membrane, a (dichroic) dye type polarizing membrane and a polyene type polarizing membrane. The iodine type polarizing membrane and the dye type polarizing membrane is usually made of a polyvinyl alcohol film.

The polarizing axis (transmission axis) of the linearly polarizing membrane is perpendicular to the stretching direction of the film.

The linearly polarizing membrane is usually attached to a protective membrane. The transparent support or an optically anisotropic layer made of a polymer film can function as the protective membrane. In the case that a protective membrane is used in addition to the transparent support or the optically anisotropic layer, the protective membrane preferably is an optically isotropic film such as a cellulose ester film, particularly a cellulose triacetate film.

[Use of Circularly Polarizing Plate]

The circularly polarizing plate can be used in various optical devices such as a reflective liquid crystal display, a pick up device for recording an optical disc, an organic electroluminescence (EL) display or an antireflection film.

A reflective liquid crystal display having a circularly polarizing plate is described in Japanese Patent Provisional Publication No. 10(1998)-186357.

The reflective liquid crystal display comprises a reflector, a liquid crystal cell and a circularly polarizing plate.

The reflector can be formed on a substrate of the liquid crystal cell. In the case that the reflector is formed on a substrate, a quarter wave plate of the circularly polarizing plate can be separated from a linearly polarizing membrane. The quarter wave plate can be arranged between the reflector and the liquid crystal layer of the cell.

The circularly polarizing plate used in the reflective liquid crystal display preferably comprises an optically anisotropic layer B, an optically anisotropic layer A and a linearly polarizing membrane in this order. The optically anisotropic layer B can be separated from the optically anisotropic layer A. For example, the optically anisotropic layer B can be arranged between the reflector and the liquid crystal cell, while the optically anisotropic layer A is arranged adjacent to the linearly polarizing membrane. Further, the optically anisotropic layer B can be arranged between one substrate and the liquid crystal layer of the cell, while the optically anisotropic layer A is arranged between the other substrate and the liquid crystal layer of the cell.

The liquid crystal cell usually comprise two substrates having transparent electrodes and a liquid crystal layer containing rod-like liquid crystal molecules to the linearly polarizing membrane. The liquid crystal cell of a twisted nematic (TN) mode is preferably used in the reflective liquid crystal display. The twist angle of the liquid crystal cell is preferably in the range of 45° to 90°.

A color filter can be arranged between the liquid crystal cell and the linearly polarizing membrane.

EXAMPLE 1

A cellulose triacetate film was used as a transparent support. The retardation value of the transparent support is essentially zero measured at the wavelength of 632.8 nm.

The following denatured polyvinyl alcohol was dissolved in a mixture of methanol and acetone (volume ratio: 50/50) to prepare a 5 wt. % solution. The solution was coated on the transparent support by using a bar coater, and air-dried at 60° C. for 2 minutes. The surface was subjected to a rubbing treatment to form an orientation layer (thickness: 1 μm).

Denatured Polyvinyl Alcohol

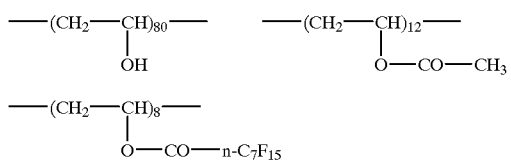

The following coating solution was coated on the orientation layer to essentially vertically align the discotic liquid crystal molecules. The layer was irradiated with an ultraviolet ray for 1 second by using a mercury lump of 500 W/cm² to polymerize the discotic liquid crystal molecules. Thus, an optically anisotropic layer A was formed.

The discotic liquid crystal molecules were homogeneously aligned. The optical axis (director) of the molecule was parallel with the lengthwise direction of the transparent support. The slow axis of the optically anisotropic layer A was perpendicular to the lengthwise direction.

| Coating solution for optically anisotropic layer A | |
|---|---|
| The following discotic liquid crystal molecule (1) | 32.6 wt. % |
| Cellulose acetate butyrate | 0.7 wt. % |
| The following denatured trimethylolpropane triacrylate | 3.2 wt. % |
| The following sensitizer | 0.4 wt. % |
| The following photopolymerization initiator | 1.1 wt. % |
| Methyl ethyl ketone | 62.0 wt. % |

Discotic Liquid Crystal Compound (1)

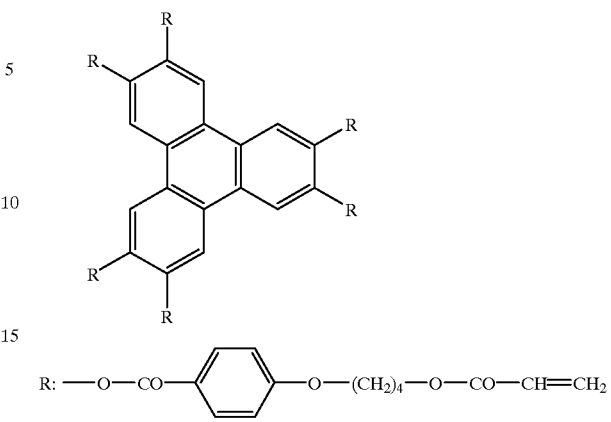

Denatured Trimethylolpropane Triacrylate

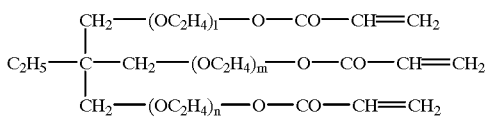

$l + m + n = 3.5$

Sensitizer

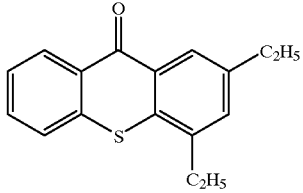

Photopolymerization Initiator

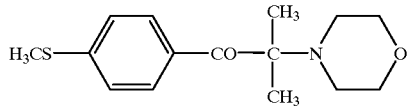

The retardation values of the optically anisotropic layer A were measured at various wavelengths. The results are set forth in FIG. 19.

A polyvinyl alcohol film (thickness: 100 μm) was uniaxially stretched along a longitudinal direction by using two rolls of different rotating speeds. Thus an optically anisotropic layer B was formed. The optically anisotropic layer B has a slow axis along a lengthwise direction.

The retardation values of the optically anisotropic layer B were measured at various wavelengths. The results are set forth in FIG. 19.

The optically anisotropic layer B was laminated on the optically anisotropic layer A formed on the transparent support. The lengthwise direction of the optically anisotropic layer B was parallel with the lengthwise direction of the transparent support.

The retardation values of the obtained quarter wave plate were measured at various wavelengths. The results are set forth in FIG. 19.

Figure 19:
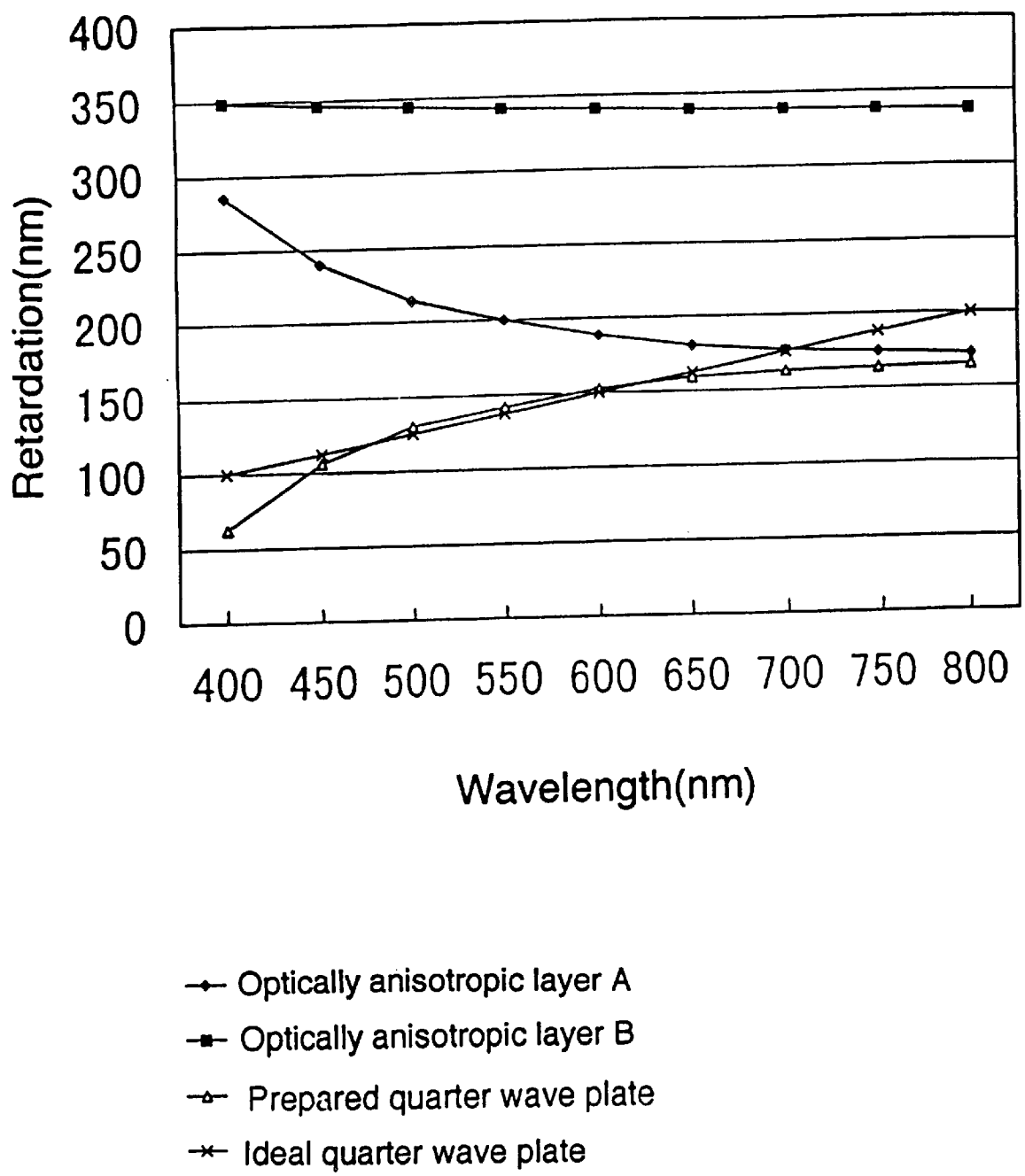

FIG. 19 is a graph showing the retardation values of the optically anisotropic layer A & B, the obtained quarter wave plate and an ideal quarter wave plate.

As is evident from the results shown in FIG. 19, the obtained quarter wave plate has retardation values analogous to the values of the ideal quarter wave plate within a wide wavelength range (450 to 700 nm).

A linearly polarizing membrane was laminated on the obtained quarter wave plate to prepare a circularly polarizing plate. The circularly polarizing plate well functioned within the wide wavelength range.

EXAMPLE 2

A cellulose triacetate film was used as a transparent support. The retardation value of the transparent support is essentially zero measured at the wavelength of 632.8 nm.

A diluted solution of a polyamic acid denatured with steroid was coated on the transparent support by using a bar coater, and air-dried at 60° C. for 2 minutes. The surface was subjected to a rubbing treatment to form an orientation layer comprising the following denatured polyimide (thickness: 1 μm).
Denatured Polyimide

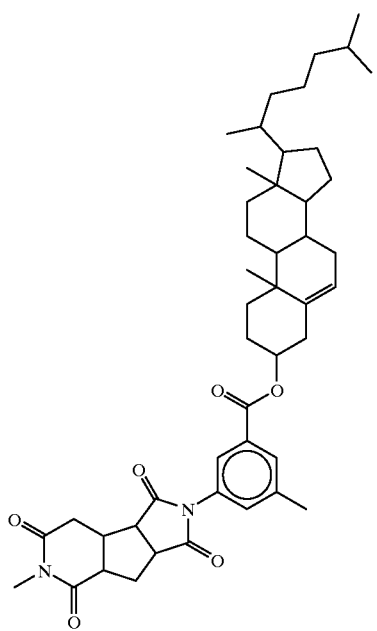

The coating solution used in Example 1 was coated on the orientation layer to essentially vertically align the discotic liquid crystal molecules. The layer was irradiated with an ultraviolet ray for 1 second by using a mercury lump of 500 W/cm² to polymerize the discotic liquid crystal molecules. Thus, an optically anisotropic layer A was formed.

The discotic liquid crystal molecules were homogeneously aligned The optical axis (director) of the molecule was parallel with the lengthwise direction of the transparent support. The slow axis of the optically anisotropic layer A was perpendicular to the lengthwise direction.

The retardation values of the optically anisotropic layer A were measured at various wavelengths. The results are set forth in FIG. 20. The main results are shown below.

Re450A: 412.5 nm
Re550A: 355 nm
Re450A/Re550A: 1.162

Pellets of polycarbonate were dissolved in methylene chloride. The solution was cast on a metal band, and dried to obtain a polycarbonate film (thickness: 100 μm). The film was uniaxially stretched at 175° C. along a longitudinal direction by 11% to obtain an optically anisotropic layer B. The optically anisotropic layer B has a retardation value of 491 nm measured at the wavelength of 632.8 nm. The optically anisotropic layer B has a slow axis along a lengthwise direction.

The retardation values of the optically anisotropic layer B were measured at various wavelengths. The results are set forth in FIG. 20. The main results are shown below.

Re450B: 535 nm
Re550B: 500 nm
Re450B/Re550B: 1.07
Re450A/Re550A−Re450B/Re550B: 0.092

The optically anisotropic layer P was laminated on the optically anisotropic layer A formed on the transparent support. The lengthwise direction of the optically anisotropic layer B was parallel with the lengthwise direction of the transparent support.

The retardation values of the obtained quarter wave plate were measured at various wavelengths. The results are set forth in FIG. 20.

Figure 20:
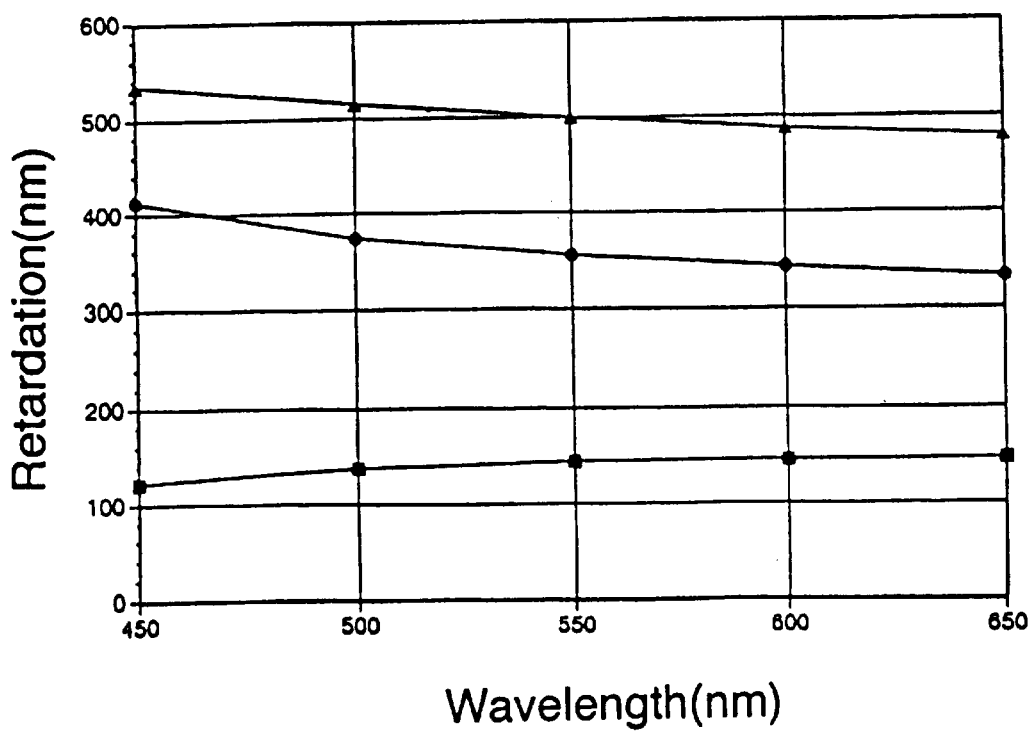

FIG. 20 is a graph showing the retardation values of the optically anisotropic layer A & B and the obtained quarter wave plate.

A linearly polarizing membrane was laminated on the obtained quarter waveplate to prepare a circularly polarizing plate. The circularly polarizing plate well functioned within a wide wavelength range.

EXAMPLE 3

The diluted solution of the polyamic acid used in Example 2 was coated on the optically anisotropic layer B prepared in Example 2 by using a bar coater, and air-dried at 60° C. for 2 minutes. The surface was subjected to a rubbing treatment to form an orientation layer (thickness: 1 μm) comprising the denatured polyimide shown in Example 2.

The coating solution used in Example 1 was coated on the orientation layer to essentially vertically align the discotic liquid crystal molecules. The layer was irradiated with an ultraviolet ray for 1 second by using a mercury lump of 500 W/cm² to polymerize the discotic liquid crystal molecules. Thus, an optically anisotropic layer A was formed.

The discotic liquid crystal molecules were homogeneously aligned. The optical axis (director) of the molecule was parallel with the lengthwise direction of the optically anisotropic layer B. The slow axis of the optically anisotropic layer A was perpendicular to the lengthwise direction.

The retardation values of the optically anisotropic layers A & B were the same as the values of the layers A & B of Example 2.

The retardation values of the obtained quarter wave plate were measured at various wavelengths. The results are set forth in FIG. 21.

Figure 21:
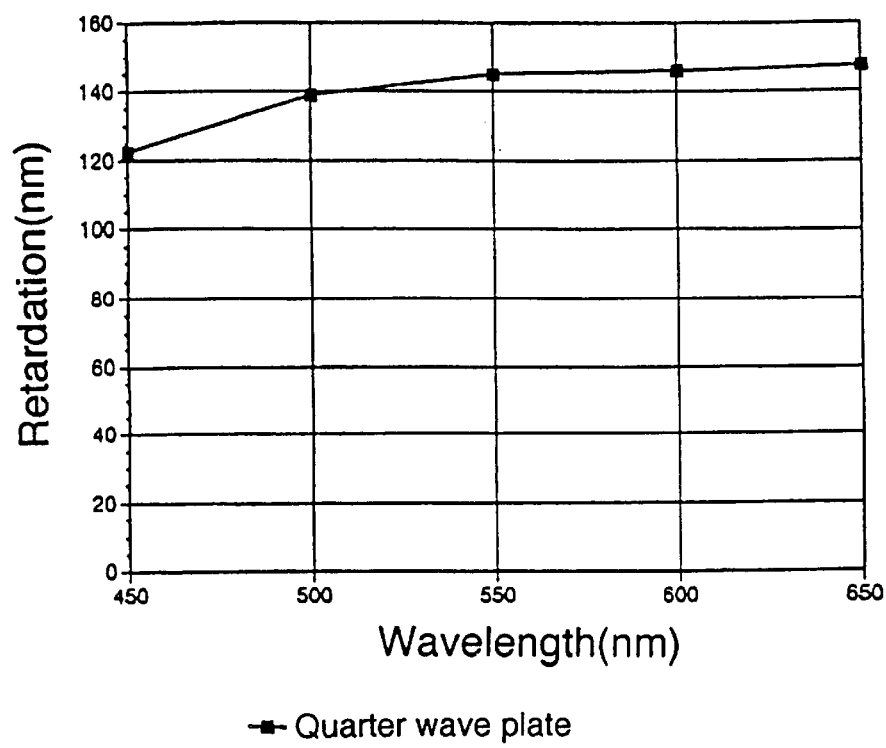

FIG. 21 is a graph showing the retardation values of the obtained quarter wave plate.

A linearly polarizing membrane was laminated on the obtained quarter wave plate to prepare a circularly polarizing plate. The circularly polarizing plate well functioned within a wide wavelength range.

EXAMPLE 4

Pellets of polycarbonate were dissolved in methylene chloride. The solution was cast on a metal band, and dried to obtain a polycarbonate film (thickness: 100 μm). The film was uniaxially stretched at 175° C. along a longitudinal direction by 6% to obtain an optically anisotropic layer B. The optically anisotropic layer B has a retardation value of 278 nm measured at the wavelength of 632.8 nm. The optically anisotropic layer B has a slow axis along a lengthwise direction.

The retardation values of the optically anisotropic layer B were measured at wavelengths of 450 nm and 550 nm. The results are shown below.

Re450B: 308 nm
Re550B: 288 nm
Re450B/Re550B: 1.07

The diluted solution of the polyamic acid used in Example 2 was coated on the optically anisotropic layer B by using a bar coater, and air-dried at 60° C. for 2 minutes. The surface was subjected to a rubbing treatment to form an orientation layer (thickness: 1 μm) comprising the denatured polyimide shown in Example 2.

The following coating solution was coated on the orientation layer to essentially vertically align the discotic liquid crystal molecules. The layer was irradiated with an ultraviolet ray for 1 second by using a mercury lump of 500 W/Cm$^2$ to polymerize the discotic liquid crystal molecules. Thus, an optically anisotropic layer A was formed.

The discotic liquid crystal molecules were homogeneously aligned. The optical axis (director) of the molecule was parallel with the lengthwise direction of the optically anisotropic layer B. The slow axis of the optically anisotropic layer A was perpendicular to the lengthwise direction.

| Coating solution for optically anisotropic layer A | |
|---|---|
| The following discotic liquid crystal molecule (2) | 32.6 wt. % |
| Cellulose acetate butyrate | 0.7 wt. % |
| The denatured trimethylolpropane triacrylate used in Example 1 | 3.2 wt. % |
| The sensitizer used in Example 1 | 0.4 wt. % |
| The following photopolymerization initiator used in Example 1 | 1.1 wt. % |
| methyl ethyl ketone | 62.0 wt. % |

Discotic Liquid Crystal Compound (2)

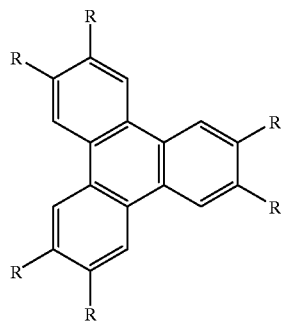

R: —O—CO—CH=CH—〈 〉—O—(CH$_2$)$_4$—O—CO—CH=CH$_2$

The retardation values of the optically anisotropic layer B were measured at wavelengths of 450 nm and 550 nm. The results are shown below.

Re450A: 182.6 nm
Re550A: 143 nm

Re450A/Re550A: 1.277
Re450A/Re550A−Re450B/Re550B: 0.207

The retardation values of the obtained quarter wave plate were measured at various wavelengths. The results are set forth in FIG. 22.

Figure 22:
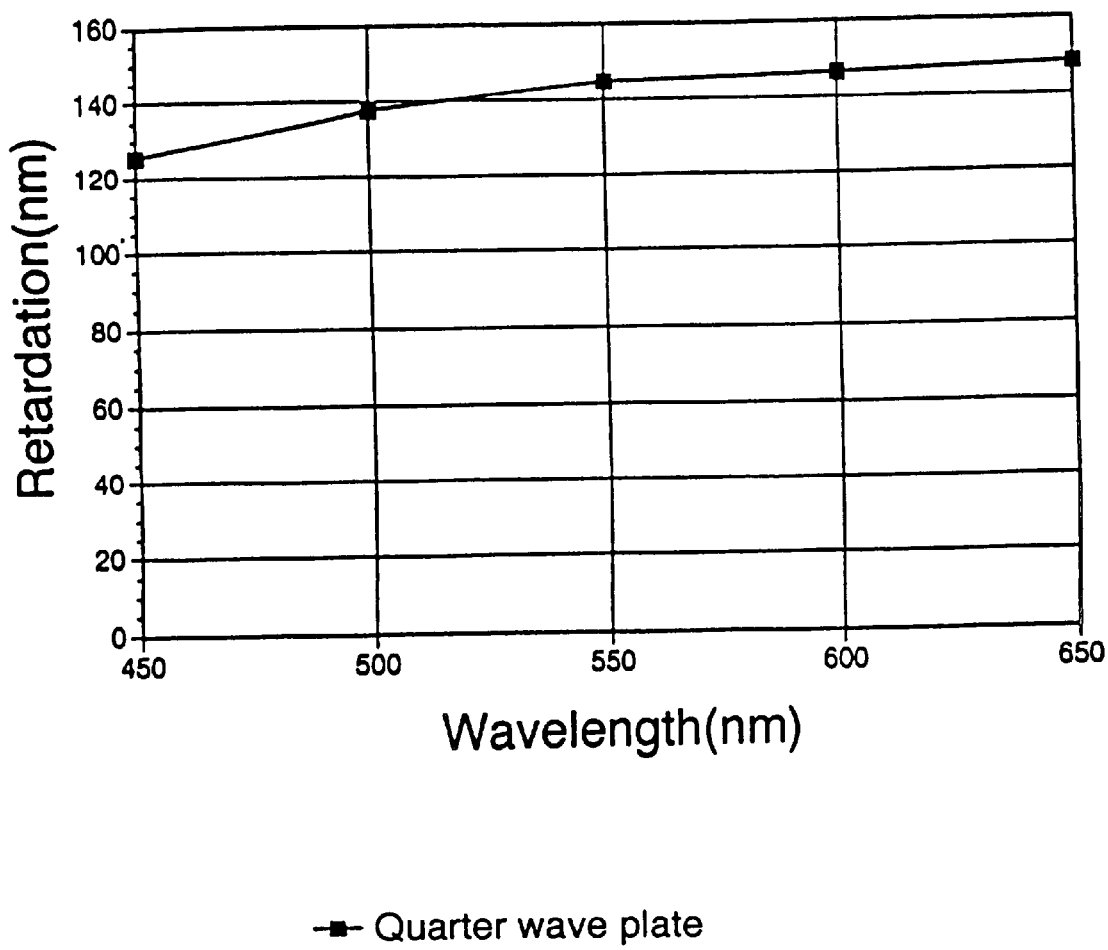

FIG. 22 is a graph showing the retardation values of the obtained quarter wave plate.

A linearly polarizing membrane was laminated on the obtained quarter wave plate to prepare a circularly polarizing plate. The circularly polarizing plate well functioned within a wide wavelength range.

EXAMPLE 5

An optically isotropic cellulose triacetate film in the form of a roll (thickness: 100 μm, width: 500 mm, length: 500 m) was used as a transparent support.

The diluted solution of the polyamic acid used in Example 2 was continuously coated on the transparent support to form a layer (thickness: 0.5 μm). The surface was continuously subjected to a rubbing treatment to form an orientation layer. The angle between the rubbing direction and the lengthwise direction was 45°.

The coating solution used in Example 1 was continuously coated on the orientation layer. The solution was dried and heated to essentially vertically align the discotic liquid crystal molecules. The layer was irradiated with an ultraviolet ray to form an optically anisotropic layer A (thickness: 1.7 μm).

The discotic liquid crystal molecules were homogeneously aligned. The angle between the optical axis (director) of the molecule and the lengthwise direction of the transparent support was 45°. The slow axis of the optically anisotropic layer A was perpendicular to the optical axis (director). The angle between the slow axis of the optically anisotropic layer A and the lengthwise direction of the transparent support was 45°.

The retardation values of the optically anisotropic layer A were measured at various wavelengths. The results are set forth in FIG. 23.

A norbornene film (thickness: 100 μm) was uniaxially stretched to form an optically anisotropic layer B. The slow axis of the optically anisotropic layer B was parallel with the lengthwise direction of the optically anisotropic layer B.

The retardation values of the optically anisotropic layer B were measured at various wavelengths. The results are set forth in FIG. 23.

Figure 23:
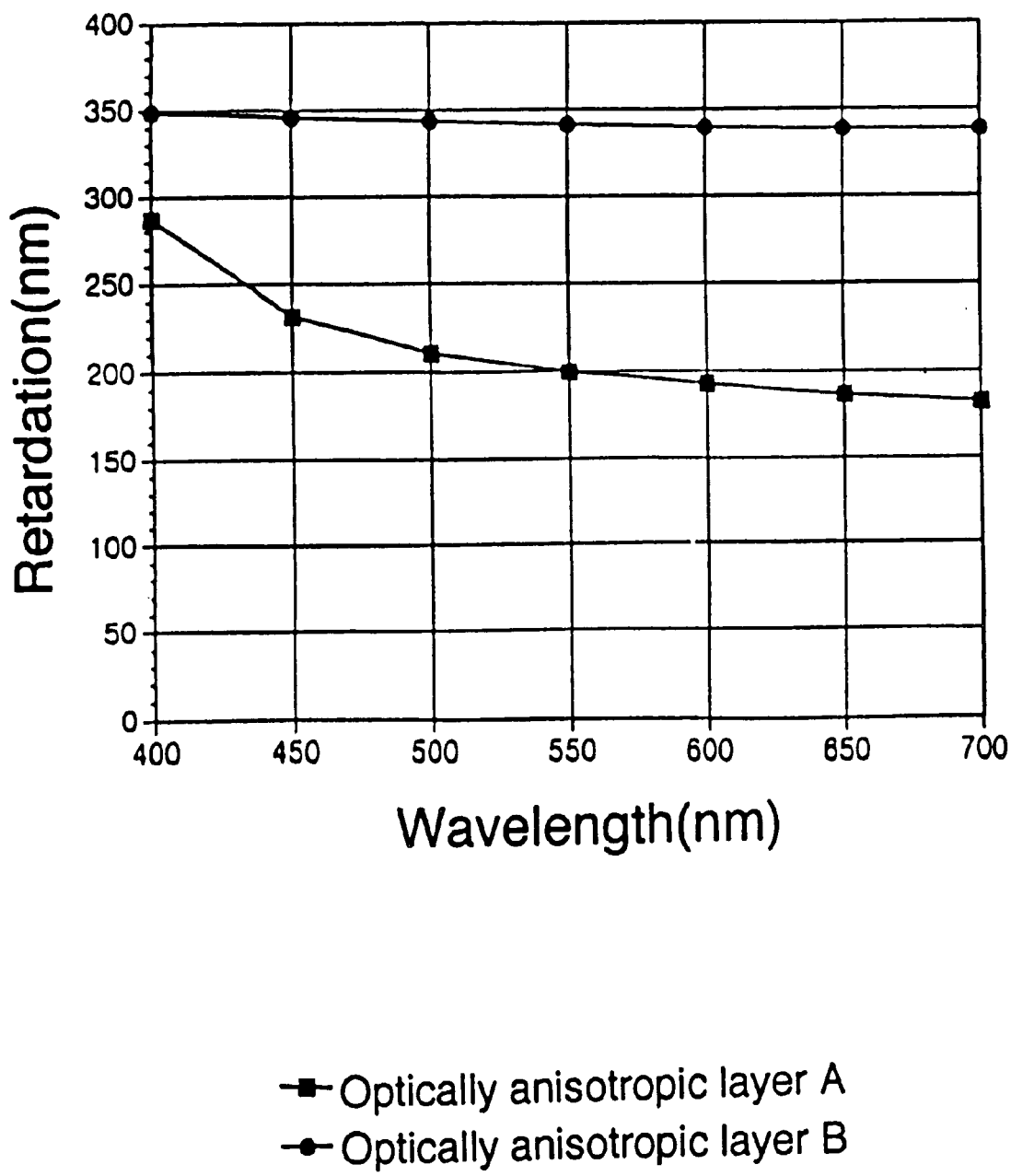

FIG. 23 is a graph showing the retardation values of the optically anisotropic layer A & B.

The optically anisotropic layer B was laminated on the optically anisotropic layer A formed on the transparent support. The slow axis of the optically anisotropic layer A was perpendicular to the slow axis of the optically anisotropic layer B. The angle between the slow axis of the optically anisotropic layer B and the lengthwise direction of the transparent support was 45°.

The retardation values of the obtained quarter wave plate were measured at wavelengths of 450 nm, 550 nm and 650 nm. The results are set forth in FIG. 24.

Figure 24:
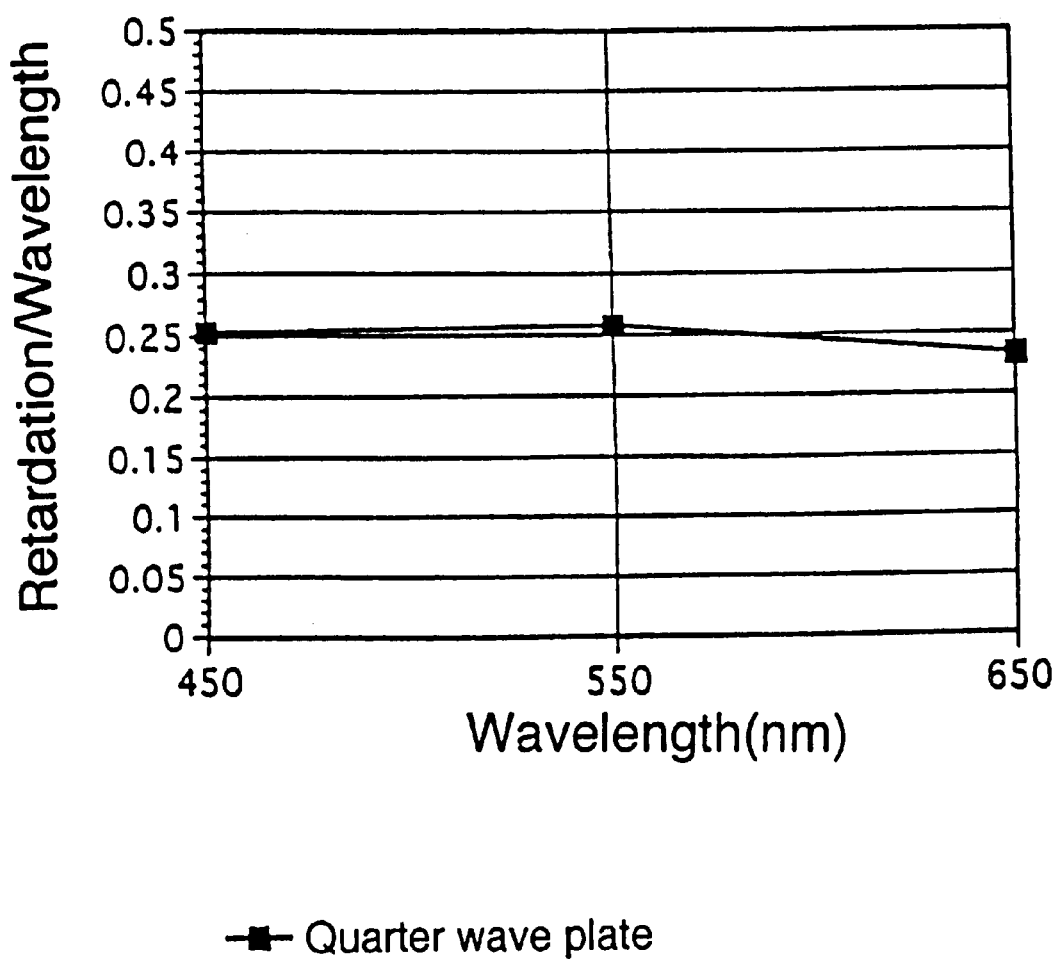

FIG. 24 is a graph showing the ratio (Re/λ) of the retardation value (Re) to the wavelengths (λ) of the obtained quarter wave plate.

A linearly polarizing membrane was laminated on the transparent support to prepare a circularly polarizing plate. The angle between the slow axis of the optical anisotropic layer A and the polarizing axis of the polarizing membrane was 45°. The angle between the slow axis of the optical anisotropic layer B and the polarizing axis of the polarizing membrane was also 45°.

The obtained circularly polarizing plate well functioned within a wide wavelength range.

EXAMPLE 6

A linearly polarizing membrane in the form of a roll was laminated on the optically anisotropic layer A prepared in Example 5 in the form of a roll according to a roll to roll method. The angle between the slow axis of the optical anisotropic layer A and the polarizing axis of the polarizing membrane was 45°. The optically anisotropic layer B prepared in Example S was further laminated on the optically anisotropic layer A to prepare a circularly polarizing plate. The slow axis of the optically anisotropic layer A was perpendicular to the slow-axis of the optically anisotropic layer B. The angle between the slow axis of the optical anisotropic layer B and the polarizing axis of the polarizing membrane was also 45°.

The obtained circularly polarizing plate well functioned within a wide wavelength range.

EXAMPLE 7

A polycarbonate film was stretched to obtain an optically anisotropic layer A.

The retardation value of the optically anisotropic layer A measured at the wavelength of 550 nm was 274 nm.

The diluted solution of the polyamic acid used in Example 2 was coated on an optically isotropic glass substrate by using a bar coater, and air-dried at 60° C. for 2 minutes. The surface was subjected to a rubbing treatment to form an orientation layer (thickness: 1 μm) comprising the denatured polyimide shown in Example 2.

The coating solution used in Example 1 was coated on the orientation layer to essentially vertically align the discotic liquid crystal molecules. The layer was irradiated with an ultraviolet ray for 1 second by using a mercury lump of 500 W/cm$^2$ to polymerize the discotic liquid crystal molecules. Thus, an optically anisotropic layer B was formed. The thickness of the optically anisotropic layer B was 1.3 μm.

The retardation value of the optically anisotropic layer B measured at the wavelength of 550 nm was 137 nm.

The optically anisotropic layer A was laminated on the optically anisotropic layer B to prepare a quarter wave plate. The angle between the slow axes of the optically anisotropy layers A and B was 60°.

A polarizing plate comprising a linearly polarizing membrane and a protective membrane was laminated on the optically anisotropic layer B of the quarter wave plate to prepare a circularly polarizing plate. The angle between the polarizing axis of the linearly polarizing membrane and the slow axis of the optically anisotropic layer A was 15°. The angle between the polarizing axis of the linearly polarizing membrane and the slow axis of the optically anisotropic layer B was 75°.

The circularly polarizing plate was irradiated with light from the side of the linearly polarizing membrane. The retardation values of transmitted light were measured. The results are set forth in Table 1.

TABLE 1

| Wavelength (measured) | 450 nm | 550 nm | 650 nm |
|---|---|---|---|
| Retardation | 109.35 nm | 137.50 nm | 152.75 nm |
| Retardation/wavelength | 0.243 | 0.250 | 0.235 |

EXAMPLE 8

An orientation layer was formed in the same manner as in Example 7, except that the layer was directly formed on the optically anisotropic layer A. The surface of the orientation layer was subjected to a rubbing treatment. The angle between the slow axis of the optically anisotropic layer A and the rubbing direction was 60°.

An optically anisotropic layer B was formed on the orientation layer in the same manner as in Example 7.

The retardation value of the optically anisotropic layer B measured at the wavelength of 550 nm was 137 nm.

A polarizing plate comprising a linearly polarizing membrane and a protective membrane was laminated on the optically anisotropic layer B of the prepared quarter wave plate to prepare a circularly polarizing plate. The angle between the polarizing axis of the linearly polarizing membrane and the slow axis of the optically anisotropic layer A was 15°. The angle between the polarizing axis of the linearly polarizing membrane and the slow axis of the optically anisotropic layer B was 75°.

The circularly polarizing plate was irradiated with light from the side of the linearly polarizing membrane. The retardation values of transmitted light were measured. The results are set forth in Table 2.

TABLE 2

| Wavelength (measured) | 450 nm | 550 nm | 650 nm |
|---|---|---|---|
| Retardation | 109.35 nm | 137.50 nm | 152.75 nm |
| Retardation/wavelength | 0.243 | 0.250 | 0.235 |

EXAMPLE 9

Two orientation layers were formed on both sides of optically isotropic cellulose triacetate film in the same manner as in Example 7. The angle between the rubbing directions of the orientation layers was 60°.

An optically anisotropic layer B was formed on one orientation layer in the same manner as in Example 7.

The retardation value of the optically anisotropic layer B measured at the wavelength of 550 nm was 137 nm.

The coating solution used in Example 1 was coated on the other orientation layer to form an optically anisotropic layer A in the same manner as in the formation of the optically anisotropic layer B in Example 7, except that the amount of the coating solution was increased.

The retardation value of the optically anisotropic layer B measured ;at the wavelength of 550 nm was 274 nm.

A polarizing plate comprising a linearly polarizing membrane and a protective membrane was laminated on the optically anisotropic layer B of the prepared quarter wave plate to prepare a circularly polarizing plate. The angle between the polarizing axis of the linearly polarizing membrane and the slow axis of the optically anisotropic layer A was 15°. The angle between the polarizing axis of the linearly polarizing membrane and the slow axis of the optically anisotropic layer B was 75°.

The circularly polarizing plate was irradiated with light from the side of the linearly polarizing membrane. The retardation values of transmitted light were measured. The results are set forth in Table 3.

TABLE 3

| Wavelength (measured) | 450 nm | 550 nm | 650 nm |
|---|---|---|---|
| Retardation | 108.00 nm | 137.50 nm | 154.05 mm |
| Retardation/wavelength | 0.240 | 0.250 | 0.237 |

EXAMPLE 10

An optically isotropic cellulose triacetate film in the form of a roll (thickness: 100 µm, width: 500 mm, length; 500 m) was used as a transparent support.

The diluted solution of the polyamic acid used in Example 2 was continuously coated on the transparent support to form a layer (thickness: 0.5 µm). The surface was continuously subjected to a rubbing treatment to form an orientation layer. The rubbing direction was parallel with the lengthwise direction.

The coating solution used in Example 1 was continuously coated on the orientation layer. The solution was dried and heated to essentially vertically align the discotic liquid crystal molecules. The layer was irradiated with an ultraviolet ray to form an optically anisotropic layer A (thickness: 3.6 µm).

The slow axis of the optically anisotropic layer A was perpendicular to the optical axis (director). The angle between the slow axis of the optically anisotropic layer A and the lengthwise direction of the transparent support was 75°.

The retardation value of the optically anisotropic layer A measured at the wavelength of 550 nm was 269 nm.

A polycarbonate film (thickness: 80 µm) was uniaxially stretched to obtain an optically anisotropic layer B.

The retardation value of the optically anisotropic layer B measured at the wavelength of 550 nm was 135 nm.

The optically anisotropic layer B was laminated on the optically anisotropic layer A to prepare a quarter wave plate. The angle between the slow axis of the optically anisotropic layer B and the lengthwise direction of the transparent support was 75°. The angle between the slow axes of the optically anisotropic layers A and B was 60°.

A linearly polarizing membrane was laminated on the transparent support of the quarter wave plate to prepare a circularly polarizing plate. The polarizing axis of the linearly polarizing membrane was parallel to the lengthwise direction of the transparent support.

The optical characteristic of the obtained circularly polarizing plate was measured (KOBRA21ADH, Oji Keisoku Kiki, Co., Ltd.). As a result the circularly polarizing plate well functioned within a wide wavelength range.

Comparison Example 1

A reflective liquid crystal display shown in FIG. 8 was prepared. The polycarbonate film prepared in Example 7 was used as the optically anisotropic layer A. Another polycarbonate film having the retardation value of 137 nm measured at the wavelength of 550 nm was used as the optically anisotropic layer B.

An image displayed on the prepared reflective liquid crystal display was observed. As a result, an image viewed from the left side or the right side was remarkably yellowish.

EXAMPLE 11

A reflective liquid crystal display shown in FIG. 8 was prepared. The layer formed from discotic liquid crystal molecules prepared in Example 10 was used as the optically anisotropic layer A. The polycarbonate film prepared in Example 10 was used as the optically anisotropic layer B.

An image displayed on the prepared reflective liquid crystal display was observed. As a result, the displayed image has a wide viewing angle. Even if the image was viewed from the left side or the right side, the image was not yellowish.

EXAMPLE 12

An optically isotropic cellulose triacetate film in the form of a roll (thickness: 100 µm, width: 500 mm, length: 500 m) was used as a transparent support.

The diluted solution of the polyamic acid used in Example 2 was continuously coated on the transparent support to form a layer (thickness: 0.5 µm). The surface was continuously subjected to a rubbing treatment to form an orientation layer. The angle between the rubbing direction and the lengthwise direction was 15°.

The coating solution used in Example 1 was continuously coated on the orientation layer. The solution was dried and heated to essentially vertically align the discotic liquid crystal molecules. The layer was irradiated with an ultraviolet ray to form an optically anisotropic layer A (thickness: 3.6 µm).

The slow axis of the optically anisotropic layer A was perpendicular to the optical axis (director). The angle between the slow axis of the optically anisotropic layer A and the lengthwise direction of the transparent support was 75°.

The retardation values of the optically anisotropic layer A were measured. The results are set forth in FIG. 25. The value measured at the wavelength of 550 nm was 269 nm.

A polycarbonate film (thickness: 80 µm) was uniaxially stretched to obtain an optically anisotropic layer B.

The retardation values of the optically anisotropic layer B were measured. The results are set forth in FIG. 25. The value measured at the wavelength of 550 nm was 135 nm.

The optically anisotropic layer B was laminated on the optically anisotropic layer A to prepare a quarter wave plate. The angle between the slow axis of the optically anisotropic layer B and the lengthwise direction of the transparent support was 75°. The angle between the slow axes of the optically anisotropic layers A and B was 60°.

The retardation values of the prepared quarter wave plate were measured. The results are set forth in FIG. 25.

Figure 25:
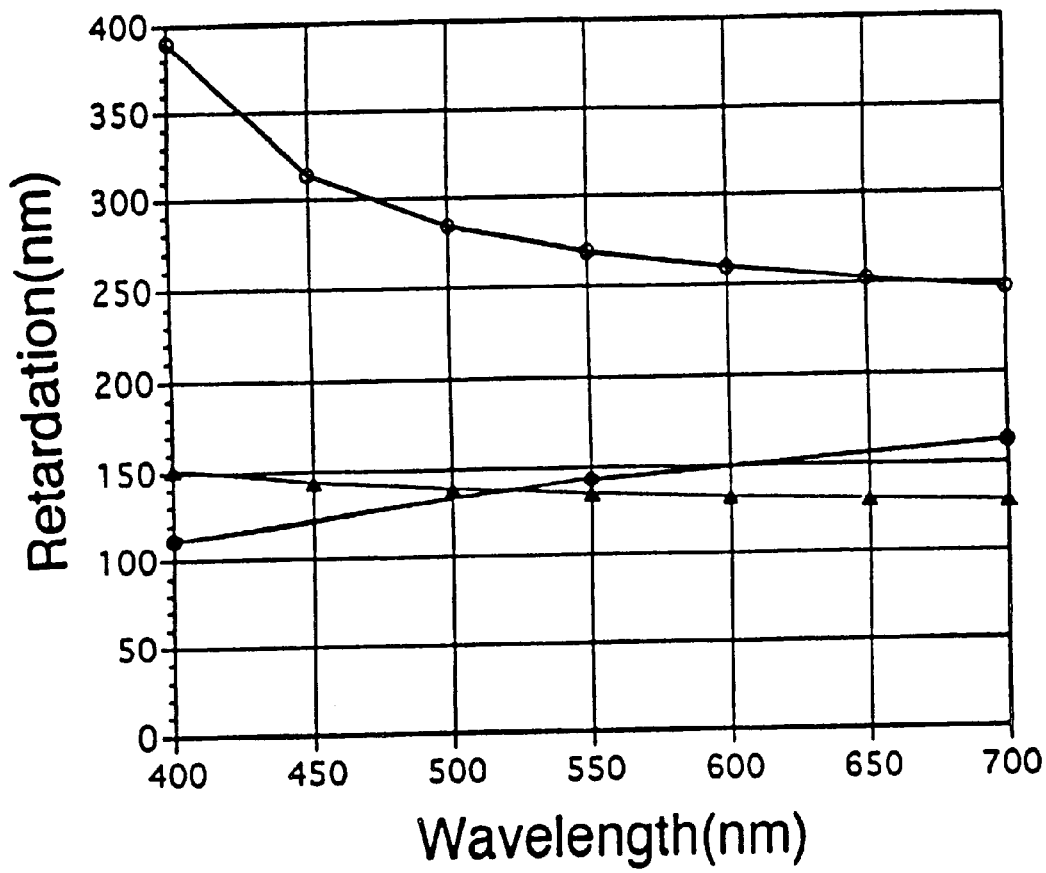

FIG. 25 is a graph showing the retardation values of the optically anisotropic layers A, B and the quarter wave plate. As is evident from the results shown in FIG. 25, the quarter wave plate well functioned within the wide wavelength range.

A linearly polarizing membrane was laminated on the transparent support of the quarter wave plate to prepare a circularly polarizing plate. The polarizing axis of the linearly polarizing membrane was parallel to the lengthwise direction of the transparent support.

The optical characteristic of the obtained circularly polarizing plate was measured (KOBRA21ADH, Oji Keisoku Kiki, Co., Ltd.). As a result, the circularly polarizing plate well functioned within the wide wavelength range.

EXAMPLE 13

A linearly polarizing membrane in the form of a roll was laminated on the optically anisotropic layer A prepared in Example 12 in the form of a roll according to a roll to roll method. The angle between the slow axis of the optical anisotropic layer A and the polarizing axis of the polarizing membrane was adjusted in the same manner as in Example 12. The optically anisotropic layer B prepared in Example 12 was further laminated on the optically anisotropic layer A to prepare a circularly polarizing plate. The angle between the slow axes of the optically anisotropic layers A and B was adjusted in the same manner as in Example 12.

The optical characteristic of the obtained circularly polarizing plate was measured (KOBRA21ADH, Oji Keisoku Kiki, Co., Ltd.). As a result, the circularly polarizing plate well functioned within the wide wavelength range. Further, the retardation values of the quarter wave plate were measured. The results were the same as the results of Example 12 shown in FIG. 25.

EXAMPLE 14

An optically isotropic cellulose triacetate film (thickness: 100 μm, width: 500 mm) was used as a transparent support.

The following coating solution was coated on the transparent support, and dried at 130° C. for 3 minutes to form a layer (thickness: 0.5 μm). The surface of the layer was subjected to a rubbing treatment to form an orientation layer.

| Coating solution for orientation layer | |
|---|---|
| The polyamic acid denatured with steroid used in Example 2 | 5.0 wt. % |
| N-methyl-2-pyrrolidone | 25.0 wt. % |
| Ethylene glycol monobutyl ether | 25.0 wt. % |
| Methyl ethyl ketone | 45.0 wt. % |

The following coating solution was coated on the orientation layer, and dried to essentially vertically align the discotic liquid crystal molecules. The layer was irradiated with an ultraviolet ray for 1 second by using a mercury lump of 500 W/cm² to polymerize the discotic liquid crystal molecules. Thus, an optically anisotropic layer A was formed. The thickness of the optically anisotropic layer A was so adjusted that the retardation value of the layer was 250 nm.

| Coating solution for optically anisotropic layer A | |
|---|---|
| The discotic liquid crystal molecule (1) used in Example 1 | 32.6 wt. % |
| Cellulose acetate butyrate | 0.2 wt. % |
| The denatured trimethylolpropane triacrylate used in Example 1 | 3.2 wt. % |
| The sensitizer used in Example 1 | 0.4 wt. % |
| The following photopolymerization initiator used in Example 1 | 1.1 wt. % |
| The chiral agent (C-2) | 0.035 wt. % |
| Methyl ethyl ketone | 62.5 wt. % |

A total reflection prism was attached to an ellipsometer (M-1500, Japan Spectrum Co., Ltd.). While turning the optically anisotropic layer A, the change of the retardation near the interface between the layer and the air was measured by using the ellipsometer. The direction of the alignment of the liquid crystal molecules was obtained from the measured results. The twist angle was obtained from the difference between the rubbing direction and the direction of the alignment. The results are set forth in FIG. 26.

A linearly polarizing membrane was laminated on the transparent substrate of the optically anisotropic layer A. The angle between the polarizing axis of the linearly polarizing membrane and the rubbing direction of the optically anisotropic layer A was 15°. The polarizing direction was analyzed (KOBURA-21DH, Oji Keisoku Kiki Co., Ltd.). The largest differences of the polarizing directions were measured at the wavelengths of 480 nm, 550 nm and 630 nm. The relation between the largest difference and the twisted angle is set forth in FIG. 27.

A polycarbonate film was used as an optically anisotropic layer B.

The retardation values of the optically anisotropic layer B at the wavelength of 550 nm was 137 nm.

A circularly polarizing plate was prepared by laminating the optically anisotropic layer B on the optically. anisotropic layer and the linearly polarizing membrane. The angle between the polarizing axis and the slow axis of the optically anisotropic layer B was 70°. The angle between the rubbing direction of the optically anisotropic layer A and the slow axis of the optically anisotropic layer B was 55°.

The retardation values of the prepared circularly polarizing plate were measured (KOBURA-31PR, Oji Keisoku Kiki Co., Ltd.). The results are set forth in FIG. 28.

The circularly polarizing plate was attached on a total reflection mirror. Then, the reflectivity was measured. The results are set forth in FIG. 29.

EXAMPLE 15

Figure 26:
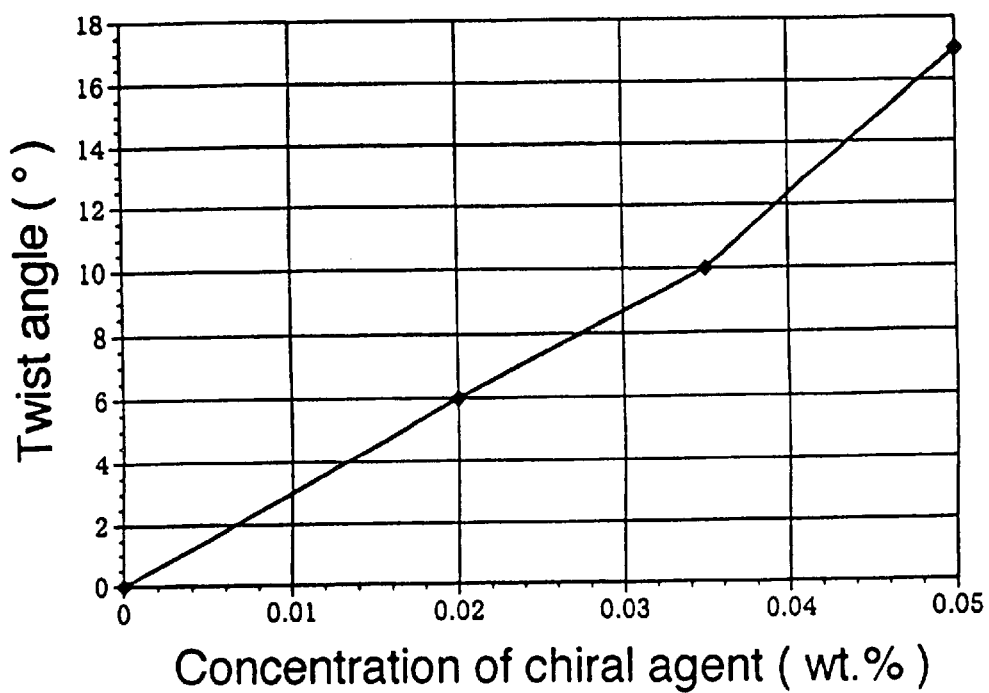

A circularly polarizing plate was prepared and evaluated in the same manner as in Example 14, except that the chiral agent (C-2) was not used The twist angle is set forth in FIG. 26. The relation between the largest difference of the polarizing directions and the twisted angle is set forth in FIG. 27. The retardation values are set forth in FIG. 28. The reflectivity is set forth in FIG. 29.

EXAMPLE 16

A circularly polarizing plate was prepared and evaluated in the same manner as in Example 14, except that the amount of the chiral agent (C-2) was changed to 0.02 wt. %. The twist angle is set forth in FIG. 26. The relation between the largest difference of the polarizing directions and the twisted angle is set forth in FIG. 27.

EXAMPLE 17

A circularly polarizing plate was prepared and evaluated in the same manner as in Example 14, except that the amount of the chiral agent (C-2) was changed to 0.05 wt. %. The twist angle is set forth in FIG. 26. The relation between the largest difference of the polarizing directions and the twisted angle is set forth in FIG. 27.

FIG. 26 is a graph showing the relation between the amount of the chiral agent and the twist angle based on the results of Examples 14 to 17.

Figure 27:
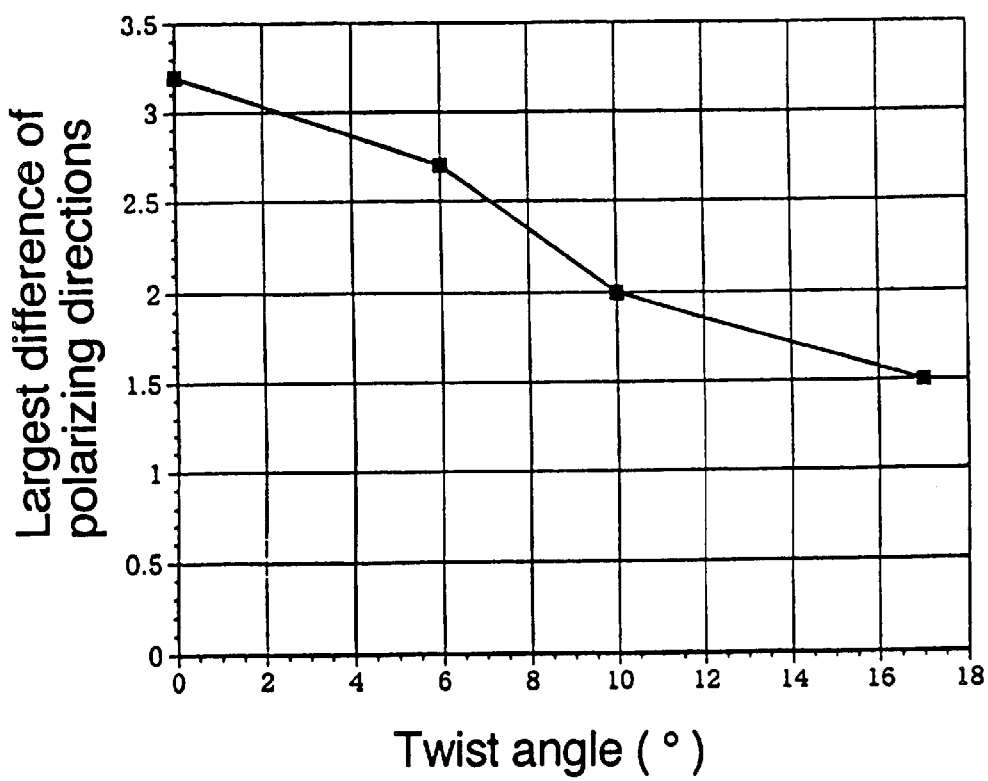

FIG. 27 is a graph showing the relation between the largest difference of the polarizing directions and the twisted angle based on the results of Examples 14 to 17.

Figure 28:
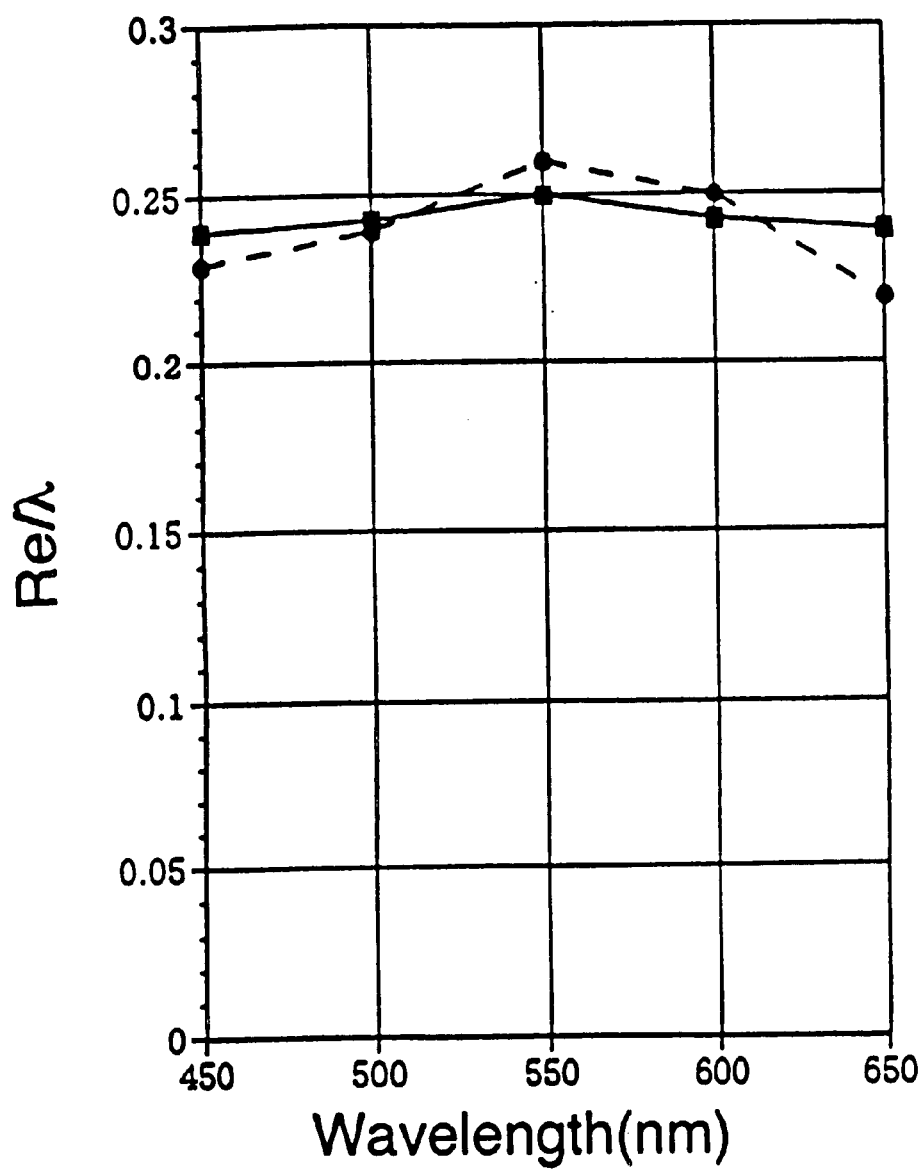
Figure 29:
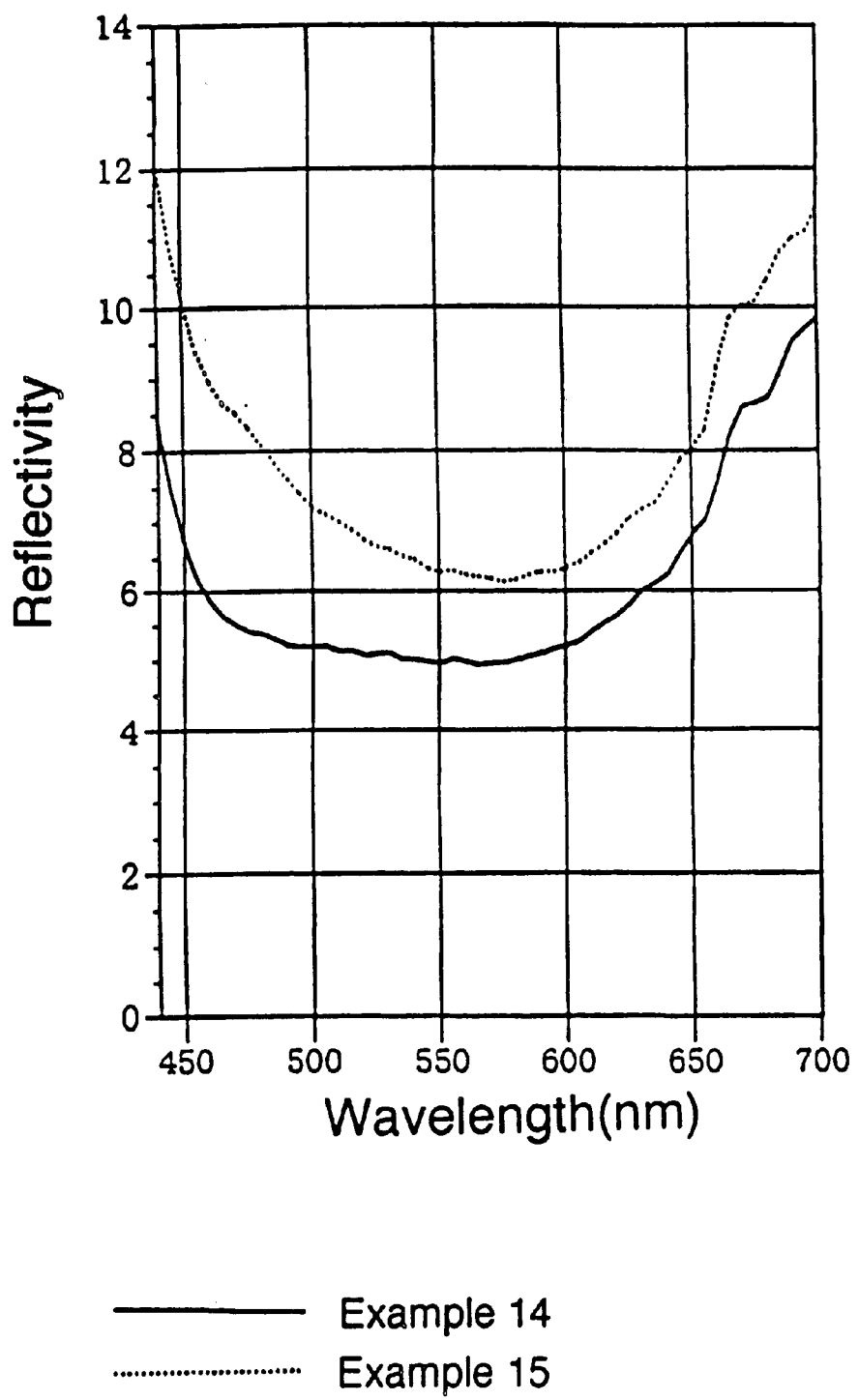

FIG. 28 is a graph showing the ratio (Re/λ) of the retardation values (Re) to the wavelengths (λ) of the circularly polarizing plates prepared in Examples 14 and 15.

FIG. 28 is a graph showing the reflectivity of the circularly polarizing plates prepared in Examples 14 and 15.

We claim:

1. A circularly polarizing plate which comprises a linearly polarizing membrane and a quarter wave plate comprising an optically anisotropic layer A and an optically anisotropic layer B, said quarter wave plate having such an optical characteristic that a retardation value essentially is a quarter of a wavelength when the retardation value is measured at the wavelength of 450 nm, 550 nm and 650 nm, wherein one of the optically anisotropic layers A and B is a layer made from discotic liquid crystal molecules, and the other is a polymer film or a layer made from liquid crystal molecules, and wherein the discotic liquid crystal molecules are aligned at an average inclined angle in the range of 50° to 90°, said inclined angle being an angle between a plane of a discotic core of the discotic liquid crystal molecule and a surface plane of the optically anisotropic layer.

2. The circularly polarizing plate as defined in claim 1, wherein each of the optically anisotropic layers A and B is a layer made from discotic liquid crystal molecules.

3. The circularly polarizing plate as defined in claim 1, wherein one of the optically anisotropic layers A and B is a layer made from discotic liquid crystal molecules, and the other is a polymer film.

4. A circularly polarizing plate which comprises a linearly polarizing membrane and a quarter wave plate comprising an optically anisotropic layer A and an optically anisotropic layer B, said quarter wave plate having such an optical characteristic that a retardation value essentially is a quarter of a wavelength when the retardation value is measured at the wavelength of 450 nm, 550 nm and 650 nm, wherein one of the optically anisotropic layers A and B is a layer made from liquid crystal molecules, and the other is a polymer film or a layer made from liquid crystal molecules, wherein each of the optically anisotropic layers A and B has a slow axis in plane, and wherein an angle between the slow axis of the optically anisotropic layer A and the slow axis of the optically anisotropic layer B is in the range of 75° to 105°, and wherein the optically anisotropic layer A has retardation values of Re450A and Re550A when the values are measured at the wavelengths of 450 nm and 550 nm respectively, and the optically anisotropic layer B has retardation values of Re450B and Re550B when the values are measured at the wavelengths of 450 nm and 550 nm respectively, and wherein the values of Re450A, Re550A, Re450B and Re550B satisfy the formulas (1) and (2):

$$Re550A < Re550B \quad (1)$$

$$Re450B/Re550B < Re450A/Re550A. \quad (2)$$

5. The circularly polarizing plate as defined in claim 4, wherein the values of Re550A and Re550B satisfy the formula (1a):

$$100 \text{ nm} < Re550B - Re550A < 180 \text{ nm}. \quad (1a)$$

6. The circularly polarizing plate as defined in claim 4, wherein the values of Re450A, Re550A, Re450B and Re550B satisfy the formula (2a):

$$Re450A/Re550A - Re450B/Re550B > 0.08. \quad (2a)$$

7. A circularly polarizing plate which comprises a linearly polarizing membrane and a quarter wave plate comprising an optically anisotropic layer A and an optically anisotropic layer B, said quarter wave plate having such an optical characteristic that a retardation value essentially is a quarter of a wavelength when the retardation value is measured at the wavelength of 450 nm, 550 nm and 650 nm, wherein one of the optically anisotropic layers A and B is a layer made from liquid crystal molecules, and the other is a polymer film or a layer made from liquid crystal molecules, wherein each of the optically anisotropic layers A and B has a slow axis in plane, and wherein an angle between the slow axis of the optically anisotropic layer A and the slow axis of the optically anisotropic layer B is in the range of 75° to 105°, and wherein the linearly polarizing membrane has a polarizing axis, and wherein an angle between the polarizing axis and the slow axis of the optically anisotropic layer A is in the range of 40° to 50°, and an angle between the polarizing axis and the slow axis of the optically anisotropic layer B is in the range of 40° to 50°.

8. A circularly polarizing plate which comprises a linearly polarizing membrane and a quarter wave plate comprising an optically anisotropic layer A and an optically anisotropic layer B, said quarter wave plate having such an optical characteristic that a retardation value essentially is a quarter of a wavelength when the retardation value is measured at the wavelength of 450 nm, 550 nm and 650 nm, wherein one of the optically anisotropic layers A and B is a layer made from liquid crystal molecules, and the other is a polymer film or a layer made from liquid crystal molecules, wherein each of the optically anisotropic layers A and B has a slow axis in plane, and wherein an angle between the slow axis of the optically anisotropic layer A and the slow axis of the optically anisotropic layer B is in the range of 75° to 105°, and wherein the quarter wave plate further comprises a transparent support having a lengthwise direction, and wherein an angle between the lengthwise direction and the slow axis of the optically anisotropic layer A is in the range of 40° to 50°, and an angle between the lengthwise direction and the slow axis of the optically anisotropic layer B is in the range of 40° to 50°.

9. A circularly polarizing plate which comprises a linearly polarizing membrane and a quarter wave plate comprising an optically anisotropic layer A and an optically anisotropic layer B, said quarter wave plate having such an optical characteristic that a retardation value essentially is a quarter of a wavelength when the retardation value is measured at the wavelength of 450 nm, 550 nm and 650 nm, wherein one of the optically anisotropic layers A and B is a layer made from liquid crystal molecules, and the other is a polymer film or a layer made from liquid crystal molecules, and wherein each of the optically anisotropic layers A and B has a slow axis in plane, and wherein an angle between the slow axis of the optically anisotropic layer A and the slow axis of the optically anisotropic layer B is in the range of 50° to 70°.

10. The circularly polarizing plate as defined in claim 9, wherein the optically anisotropic layer A has a retardation value in the range of 150 to 350 nm when the value is measured at the wavelength of 550 nm, and the optically anisotropic layer B has a retardation value in the range of 60 to 170 nm when the value is measured at the wavelength of 550 nm.

11. The circularly polarizing plate as defined in claim 10, wherein the optically anisotropic layer A has a retardation value in the range of 210 to 300 nm when the value is measured at the wavelength of 550 nm, and the optically anisotropic layer B has a retardation value in the range of 115 to 150 nm when the value is measured at the wavelength of 550 nm.

12. The circularly polarizing plate as defined in claim 10, wherein the optically anisotropic layer A is a layer made from liquid crystal molecules, said liquid crystal molecules being twisted at a twist angle in the range of 3° to 45°.

13. The circularly polarizing plate as defined in claim 9, wherein the linearly polarizing membrane has a polarizing axis, and wherein an angle between the polarizing axis and the slow axis of one of the optically anisotropic layers A and B is in the range of 60° to 80°, and an angle between the polarizing axis and the slow axis of the other is in the range of 10° to 30°.

14. The circularly polarizing plate as defined in claim 9, wherein the quarter wave plate further comprises a transparent support having a lengthwise direction, and wherein an angle between the lengthwise direction and the slow axis of one of the optically anisotropic layers A and B is in the range of 60° to 80°, and an angle between the lengthwise direction and the slow axis of the other is in the range of 10° to 30°.

* * * * *